United States Patent
Taniyama

(10) Patent No.: US 8,514,503 B2
(45) Date of Patent: Aug. 20, 2013

(54) IMAGING LENS, IMAGING APPARATUS AND INFORMATION TERMINAL APPARATUS

(75) Inventor: Minoru Taniyama, Saitama (JP)

(73) Assignee: Fujifilm Corporation, Tokyo (JP)

( * ) Notice: Subject to any disclaimer, the term of this patent is extended or adjusted under 35 U.S.C. 154(b) by 35 days.

(21) Appl. No.: 13/239,676

(22) Filed: Sep. 22, 2011

(65) Prior Publication Data

US 2012/0069449 A1    Mar. 22, 2012

(30) Foreign Application Priority Data

Sep. 22, 2010   (JP) .................................. 2010-211584
Sep. 14, 2011   (JP) .................................. 2011-200186

(51) Int. Cl.
G02B 9/34       (2006.01)
G02B 15/14      (2006.01)

(52) U.S. Cl.
USPC .................................... 359/772; 359/686

(58) Field of Classification Search
USPC ............... 359/648, 686, 771, 772, 773, 774, 359/780
See application file for complete search history.

(56) References Cited

FOREIGN PATENT DOCUMENTS

JP    2006184763    7/2006

*Primary Examiner* — Jack Dinh
(74) *Attorney, Agent, or Firm* — Young & Thompson

(57) ABSTRACT

When an optical image is formed through an imaging lens on an imaging surface that is convex toward a light incident side, the imaging lens is constructed in such a manner that a defocus MTF peak position at an arbitrary image height in a range of from 70% to 100% of a maximum image height of the optical image is located further in a light-traveling direction than a same kind of defocus MTF peak position on an optical axis of the imaging lens.

12 Claims, 11 Drawing Sheets

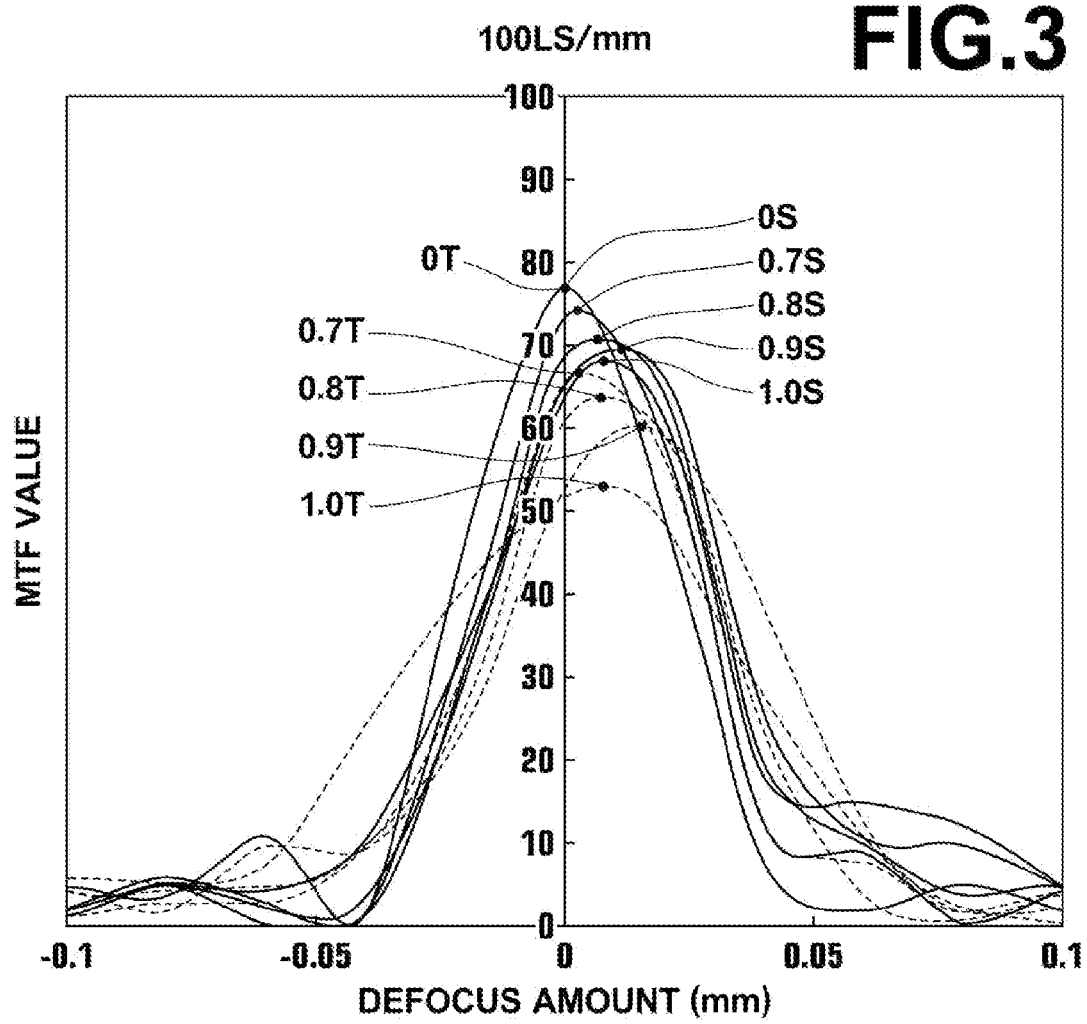

EXAMPLE 1

EXAMPLE 1 100LS/mm

EXAMPLE 2

EXAMPLE 3

EXAMPLE 5

EXAMPLE 5

IMAGING LENS, IMAGING APPARATUS AND INFORMATION TERMINAL APPARATUS

BACKGROUND OF THE INVENTION

1. Field of the Invention

The present invention relates to an imaging lens. In particular, the present invention relates to an imaging lens for imaging an optical image of an object, an imaging apparatus including the imaging lens, and an information terminal apparatus including the imaging apparatus.

2. Description of the Related Art

Conventionally, an imaging apparatus for imaging an optical image of an object formed on an imaging surface through an imaging lens is known. Generally, the imaging surface of an imaging device included in such an imaging apparatus is flat. Therefore, an imaging lens used in the imaging apparatus is designed so that optical images, in which generation of various aberrations is minimized, are formed on the imaging plane, which is a flat surface (please refer to Japanese Unexamined Patent Publication No. 2006-184783 (Patent Document 1)).

As an imaging device having a flat imaging surface, a CCD (charge coupled device) and a CMOS (complementary metal oxide semiconductor), in which many light receiving pixels are arranged, are known.

Meanwhile, there are a demand for further reduction in the size of the imaging apparatus, which includes the imaging lens and the imaging device as described above, and a demand for higher resolution. Therefore, improvement has been attempted to reduce the thickness of the imaging device while increasing the pixel number of the imaging device. However, when the thickness of the imaging device is reduced, the imaging surface of the imaging device is warped (curved) in some cases. In such a case, the deformation of the imaging surface causes the quality of an image obtained by imaging by the imaging apparatus to deteriorate.

For example, a curvature of field of the imaging lens may be increased so that an optical image formed through the imaging lens follows the shape of the deformed imaging surface that is convex toward the light incident side. However, in some cases, sufficient recovery of the contrast of the optical image formed on the deformed imaging surface is impossible by such a method. Therefore, there is a demand for suppressing a deterioration in the quality of the optical image formed on the deformed imaging surface as described above in a more reliable manner.

Here, the deformation of the imaging surface is convex toward the light incident side of the imaging surface because of production process of the imaging device.

SUMMARY OF THE INVENTION

In view of the foregoing circumstances, it is an object of the present invention to provide an imaging lens that can suppress a deterioration in the quality of an optical image formed on an imaging surface that is convex toward a light incident side. Further, it is another object of the present invention to provide an imaging apparatus including the imaging lens, and an information terminal apparatus including the imaging apparatus.

A first imaging lens of the present invention is an imaging lens for forming an optical image of an object on an imaging surface that is convex toward a light incident side, wherein a defocus MTF (modulated transfer function) peak position in a sagittal direction or a tangential direction at an arbitrary image height in a range of from 70% to 100% of a maximum image height of the optical image is located further in a light-traveling direction than a same kind of defocus MTF peak position on an optical axis of the imaging lens (in other words, the same kind of defocus MTF peak position on the optical axis is closer to the object side).

The first imaging lens of the present invention may be constructed in such a manner that the defocus MTF peak position in the sagittal direction or the tangential direction at the maximum image height is located further in a light-traveling direction than a same kind of defocus MTF peak position on the optical axis.

The first imaging lens of the present invention may be constructed in such a manner that the defocus MTF peak position in the sagittal direction or the tangential direction at 80% of the maximum image height is located further in a light-traveling direction than a same kind of defocus MTF peak position on the optical axis.

It is desirable that the first imaging lens of the present invention is constructed in such a manner that a defocus MTF peak position in a sagittal direction or a tangential direction at an arbitrary image height in a range of from 70% to 100% of the maximum image height of the optical image is located, by more than or equal to 0.005 mm and less than or equal to 0.025 mm, further in a light-traveling direction than a same kind of defocus MTF peak position on an optical axis of the imaging lens.

A second imaging lens of the present invention is an imaging lens for forming an optical image of an object on an imaging surface that is convex toward a light incident side, wherein defocus MTF peak positions in a sagittal direction or a tangential direction at all of image heights in a range of from 80% to 100% of a maximum image height of the optical image are located further in a light-traveling direction than a same kind of defocus MTF peak position on an optical axis of the imaging lens.

The second imaging lens of the present invention may be constructed in such a manner that defocus MTF peak positions in the sagittal direction or the tangential direction at all of image heights in a range of from 70% to 100% of the maximum image height are located further in a light-traveling direction than a same kind of defocus MTF peak position on the optical axis.

It is desirable that the second imaging lens of the present invention is constructed in such a manner that defocus MTF peak positions in a sagittal direction or a tangential direction at all of image heights in a range of from 80% to 100% of the maximum image height of the optical image are located, by more than or equal to 0.005 mm and less than or equal to 0.025 mm, further in a light-traveling direction than a same kind of defocus MTF peak position on an optical axis of the imaging lens.

In the first imaging lens and the second imaging lens, it is desirable that defocus MTF peak positions in a sagittal direction or a tangential direction at all image heights are located within a range of 0.02 mm from a same kind of defocus MTF peak position on an optical axis of the imaging lens, at which the image height is 0%.

It is desirable that each of the first imaging lens and the second imaging lens is composed of a first lens having positive power, a second lens, a third lens having positive power and a fourth lens, which are arranged in this order from an object side of the imaging lens, and that the following formulas (1) and (2) are satisfied at the same time:

$$0.49 < f1/f < 1.0 \qquad (1); \text{ and}$$

$$0.5 < f3/f < 3.0 \qquad (2), \text{ where}$$

f is the focal length of the entire system of the imaging lens,
f1 is the focal length of the first lens, and
f3 is the focal length of the third lens.

It is more desirable that the first imaging lens and the second imaging lens satisfy the following formulas (3) and (4) at the same time:

$$0.49 < f1/f < 0.69 \quad (3); \text{ and}$$

$$0.7 < f3/f < 2.0 \quad (4).$$

An imaging apparatus of the present invention is an imaging apparatus comprising:

an imaging lens of the present invention; and an imaging device having the imaging surface for imaging the optical image formed through the imaging lens.

Further, an information terminal apparatus of the present invention includes an imaging apparatus of the present invention.

The phrase "on an optical axis" means that the image height is 0. In other words, the phrase represents a state in which the image height is 0% of a maximum image height.

The imaging surface is an area in which an optical image of an object is formed through an imaging lens, and in which the optical image is imaged. In other words, an area in which an optical image of an object is formed and imaged is the imaging surface. Therefore, an area in which no optical image of an object is formed is not an imaging surface. Further, even if an optical image is formed in an area, the area in which the optical image is not imaged is not an imaging surface.

More specifically, an imaging surface is an area on an imaging device, and an optical image to be imaged by an imaging apparatus that includes an imaging lens and the imaging device is formed on the imaging surface. Therefore, an area on the imaging device in which no optical image is formed through the imaging lens is not an imaging surface even if imaging is possible in the area. Further, an area on the imaging device in which imaging of an optical image is not possible is not an imaging surface, even if the optical image is formed in the area.

The term "light incident side" is a side of an imaging surface, from which light enters the imaging surface.

The term "light-traveling direction" is a direction along an optical axis, and in which light travels forward.

Further, the image height is a height based on an optical axis of an imaging lens that crosses an imaging surface. The image height is a distance (a height in a direction orthogonal to the optical axis) from the optical axis to a specific position in an optical image formed on the imaging surface.

Further, the maximum image height is a distance from the optical axis, based on which image heights are measured, to a position that is farthest from the optical axis in the imaging surface (an optical image formed in the imaging surface) (the distance is a height in a direction orthogonal to the optical axis).

Further, the phrase "a same kind of defocus MTF peak position" means a defocus MTF peak position obtained when an object distance and a spatial frequency of the object are the same but an image height is different.

Further, a defocus MTF peak position is a position at a maximum MTF value in a defocus MTF curve, which is plotted by obtaining MTF values while defocusing is performed (the defocus MTF peak position is a position in a defocus direction, in other words, a position in the direction of the optical axis).

Further, the MTF values, the defocus MTF curve and the like may be obtained with respect to an object located at infinity having a spatial frequency of 100 LS/mm.

To solve the aforementioned problems, the inventor of the present invention paid attention to defocus MTF peak positions in an imaging lens, and examined them variously. As a result, the inventor has found that when an optical image is formed on an imaging surface that is convex toward a light incident side, it is possible to suppress a deterioration in the quality of the optical image formed on the imaging surface in a more reliable manner by designing the imaging lens so that a defocus MTF peak position or positions follow (or are located along) the shape of the imaging surface than by increasing a curvature of field of the imaging lens so that the optical image formed through the imaging lens follows the imaging surface. On these findings, the inventor has reached the present invention.

The imaging lens of the present invention forms an optical image of an object on an imaging surface that is convex toward a light incident side. Further, a defocus MTF peak position in a sagittal direction or a tangential direction at an arbitrary image height in a range of from 70% to 100% of a maximum image height of the optical image, or defocus MTF peak positions in a sagittal direction or a tangential direction at all of image heights in a range of from 80% to 100% of a maximum image height of the optical image are located further in a light-traveling direction than a same kind of defocus MTF peak position on an optical axis of the imaging lens. Since the imaging lens of the present invention is constructed in such a manner, it is possible to suppress a deterioration in the quality of an optical image formed on the imaging surface that is convex toward the light incident side in a more reliable manner.

According to the findings by the inventor of the present invention, it is possible to make a change in a defocus MTF peak position with respect to an image height follow a curved imaging surface by setting a defocus MTF peak position or positions as described above. Therefore, it is possible to increase the contrast of the optical image formed on the imaging surface in a more reliable manner than a conventional method. Accordingly, it is possible to suppress a deterioration in the quality of an optical image formed on the imaging surface that is convex toward a light incident side in a more reliable manner.

BRIEF DESCRIPTION OF THE DRAWINGS

FIG. 3 is a diagram illustrating peak positions on defocus MTF curves related to the imaging lens;

DESCRIPTION OF THE PREFERRED EMBODIMENTS

Figure 1:
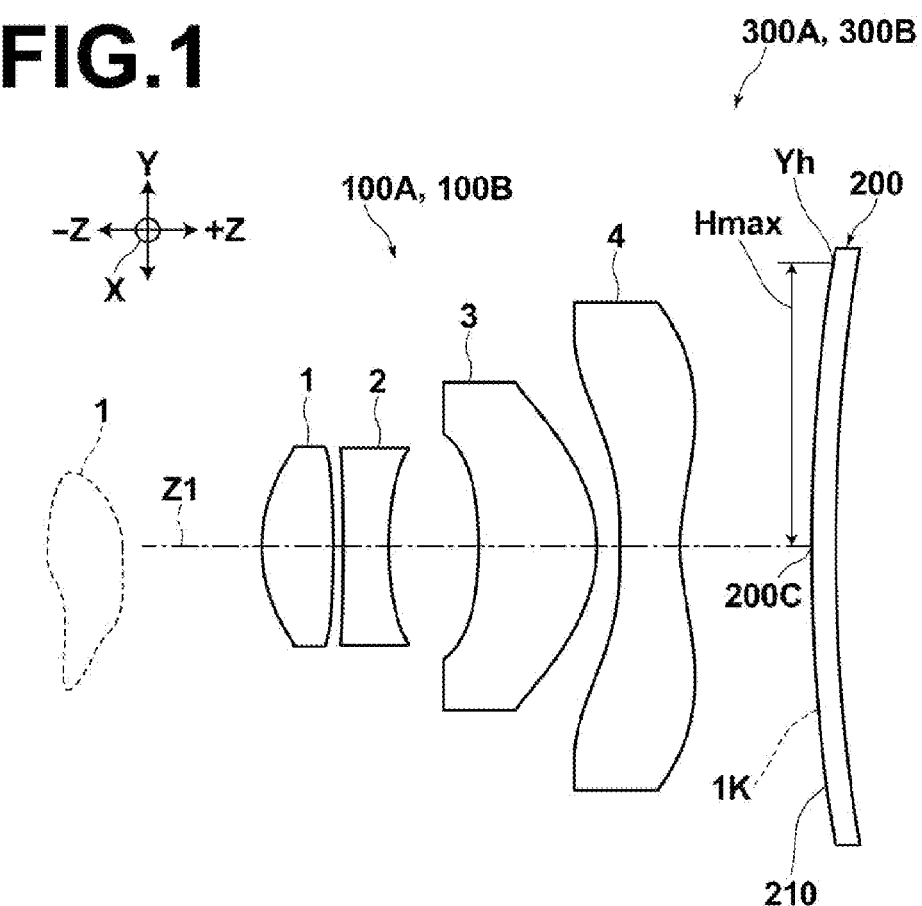
FIG. 1 is a schematic diagram illustrating the structure of an imaging lens or the like according to an embodiment of the present invention.
Figure 2:
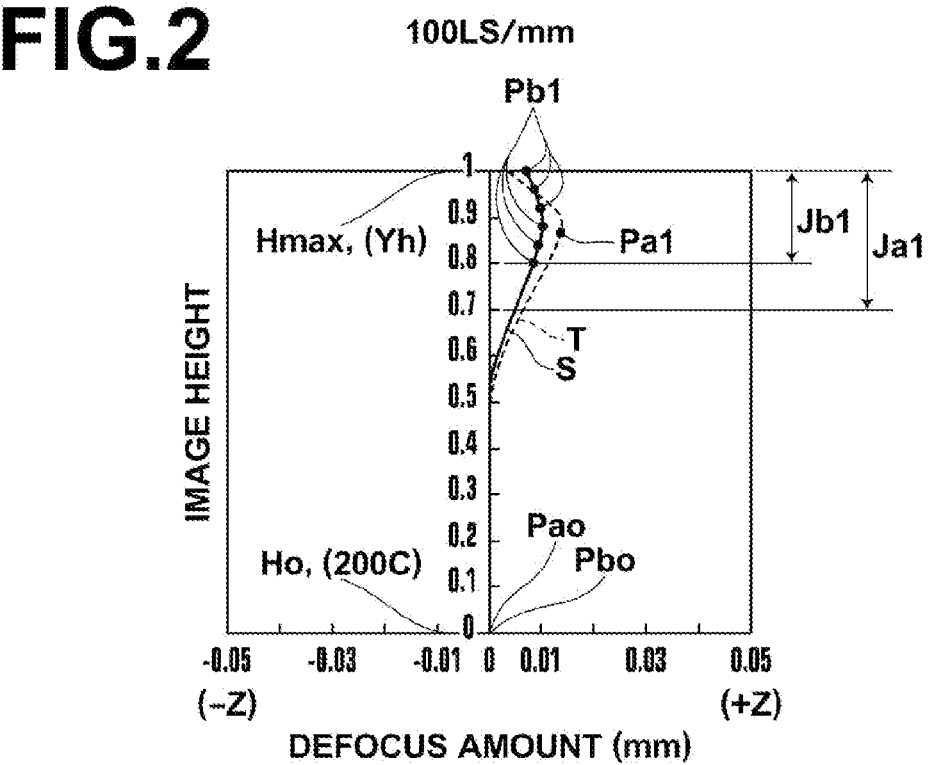
FIG. 2 is a diagram illustrating a defocus MTF peak curve related to the imaging lens.
Figure 4A:
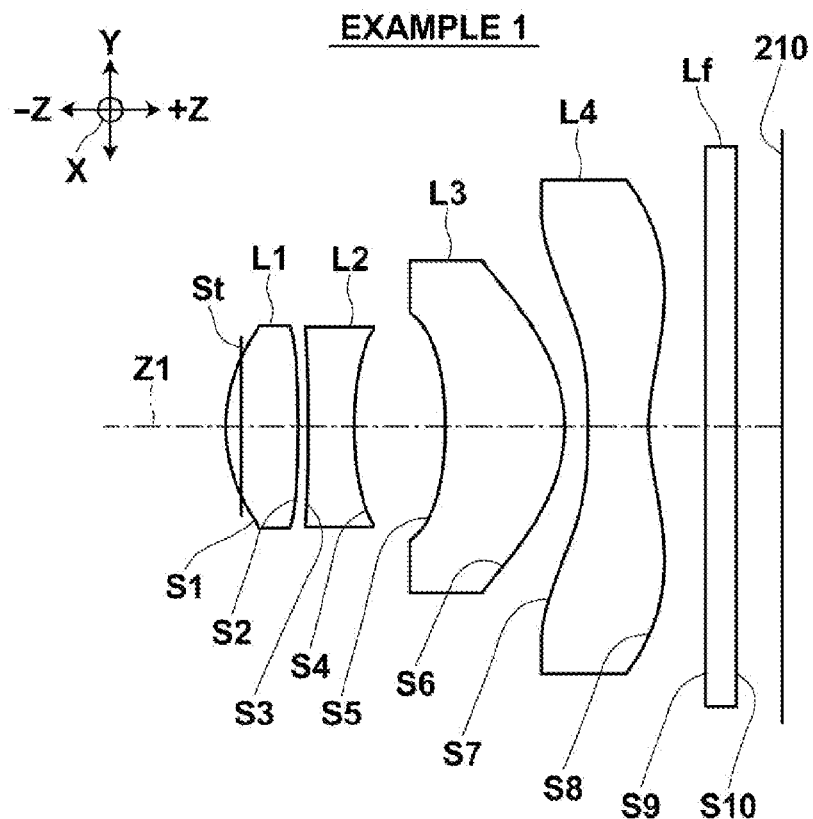
FIG. 4A is a diagram illustrating the structure of an imaging lens in Example 1.
Figure 4B:
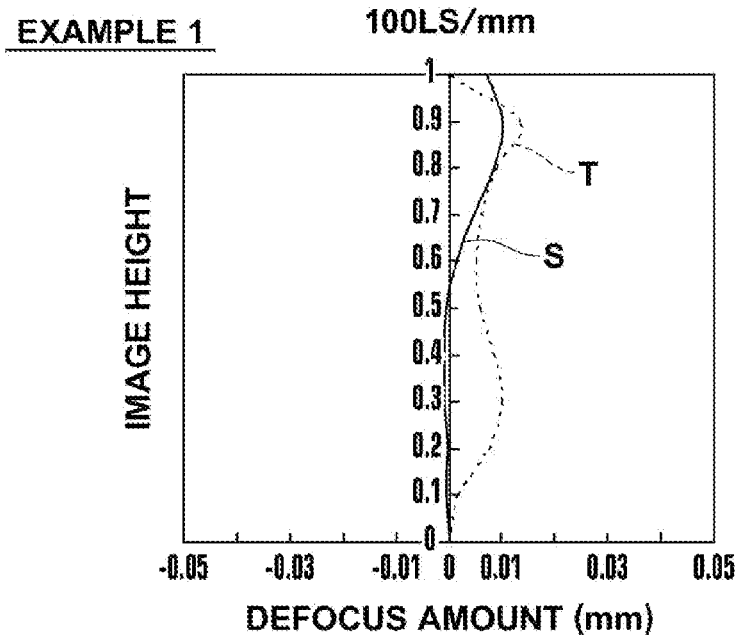
FIG. 4B is a diagram illustrating a defocus MTF peak curve related to the imaging lens in Example 1.
Figure 5A:
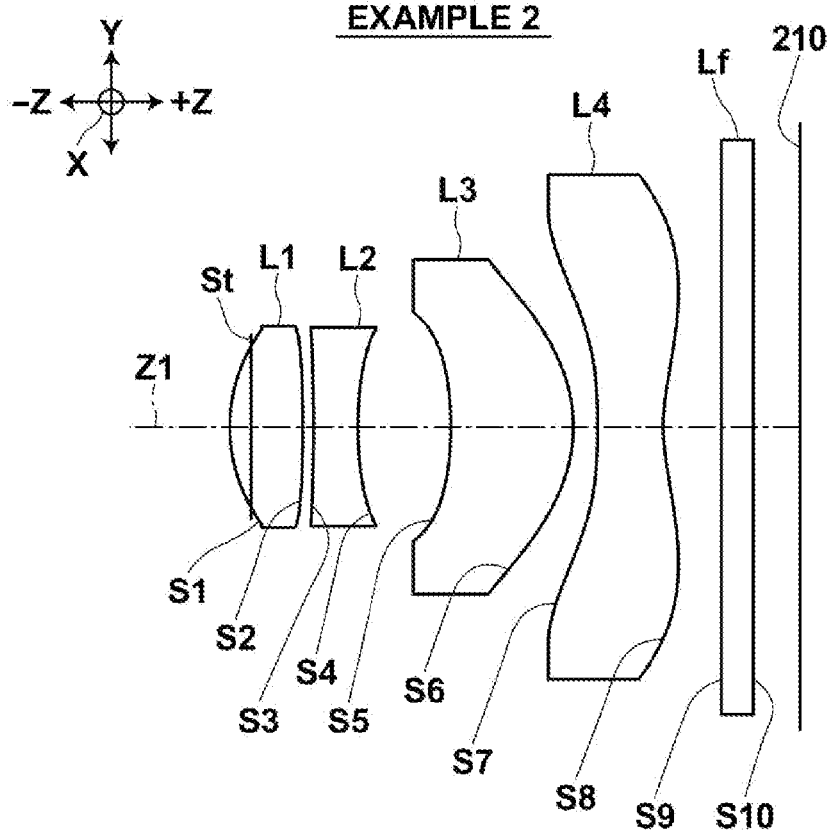
FIG. 5A is a diagram illustrating the structure of an imaging lens in Example 2.
Figure 5B:
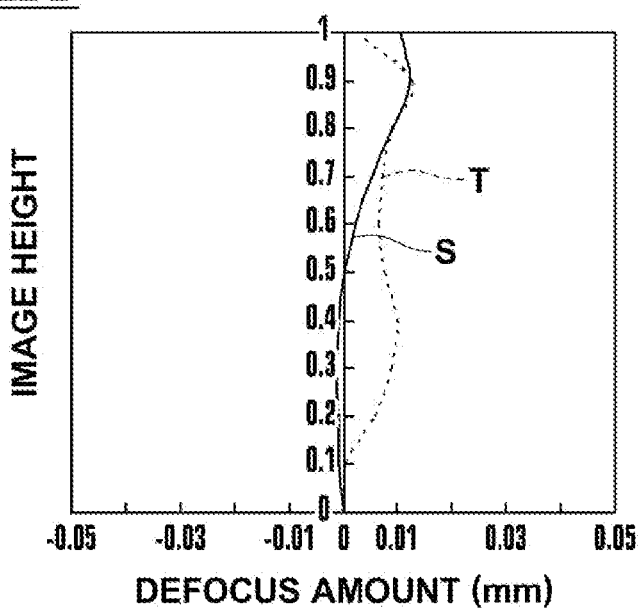
FIG. 5B is a diagram illustrating a defocus MTF peak curve related to the imaging lens in Example 2.
Figure 6A:
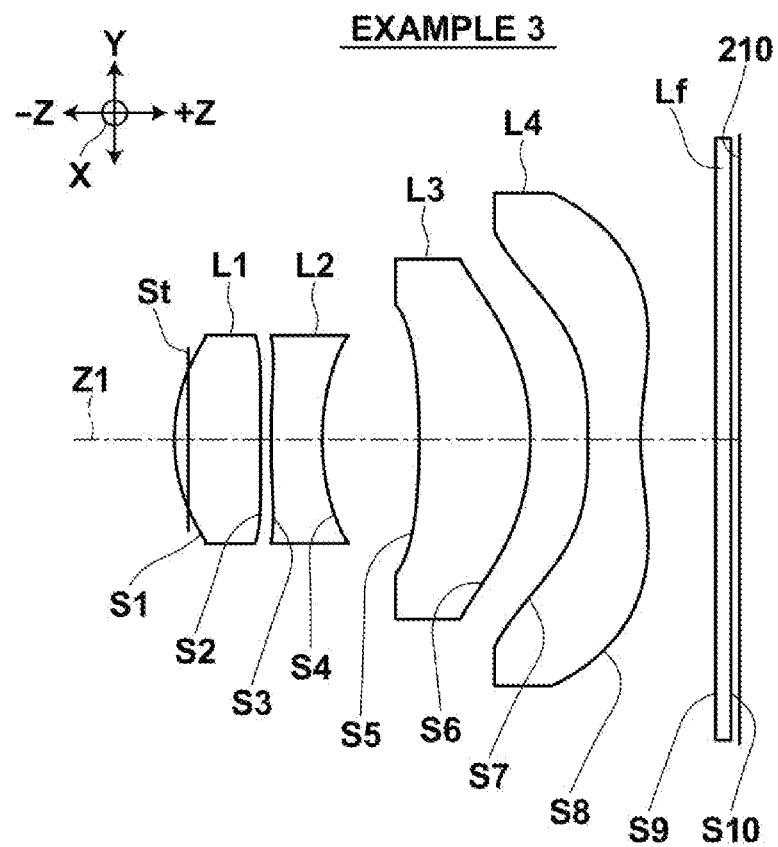
FIG. 6A is a diagram illustrating the structure of an imaging lens in Example 3.
Figure 6B:
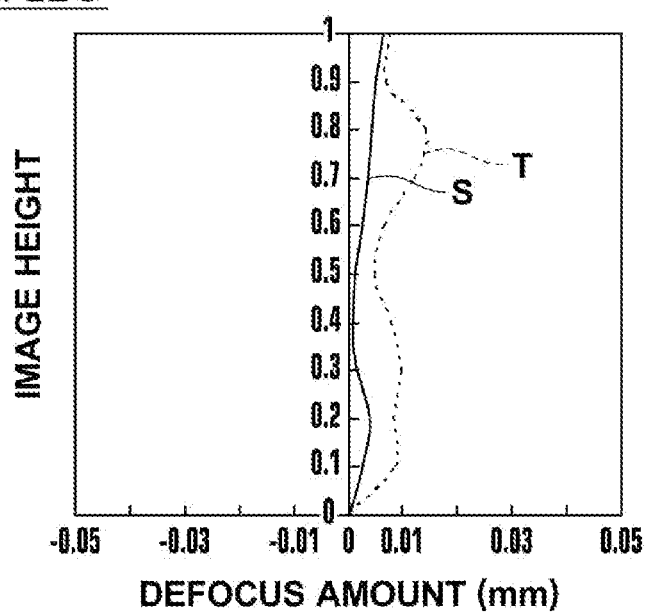
FIG. 6B is a diagram illustrating a defocus MTF peak curve related to the imaging lens in Example 3.
Figure 7A:
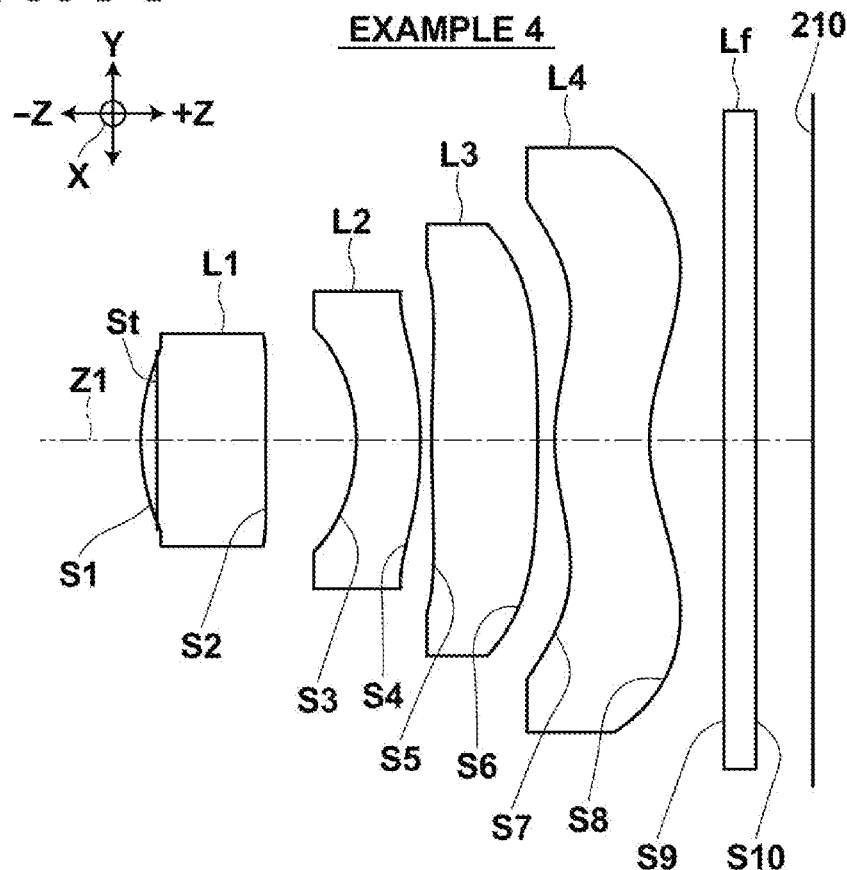
FIG. 7A is a diagram illustrating the structure of an imaging lens in Example 4.
Figure 7B:
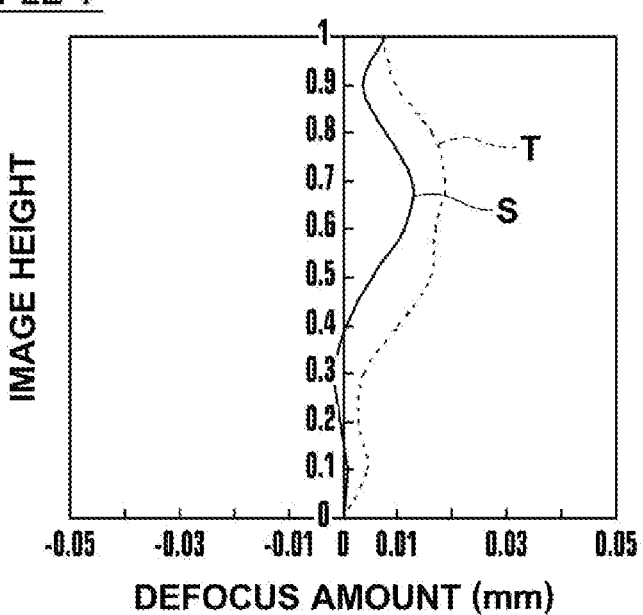
FIG. 7B is a diagram illustrating a defocus MTF peak curve related to the imaging lens in Example 4.
Figure 8A:
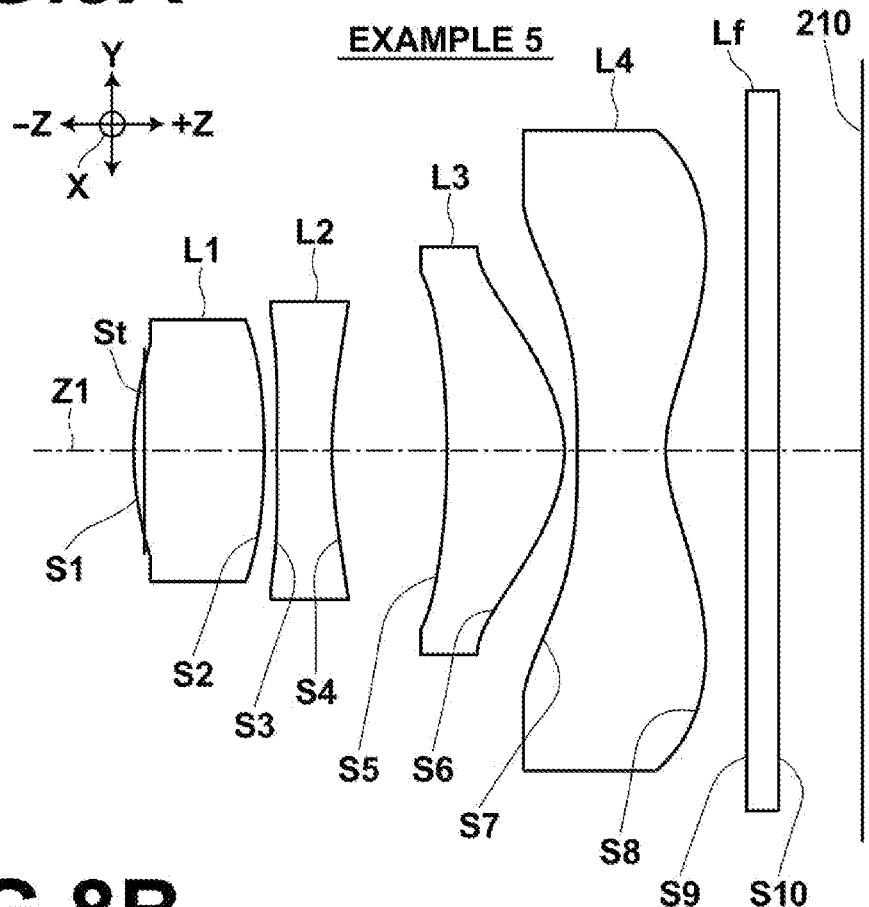
FIG. 8A is a diagram illustrating the structure of an imaging lens in Example 5.
Figure 8B:
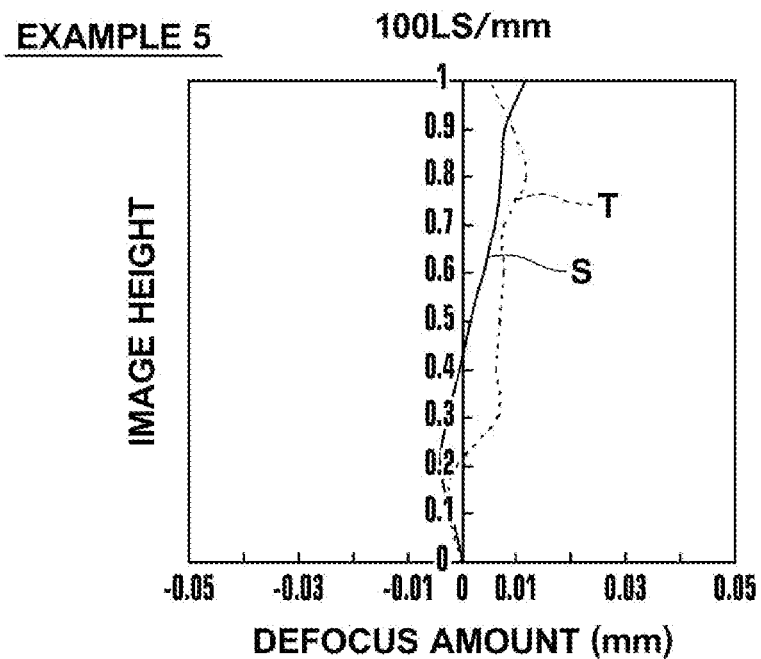
FIG. 8B is a diagram illustrating a defocus MTF peak curve related to the imaging lens in Example 5.
Figure 9A:
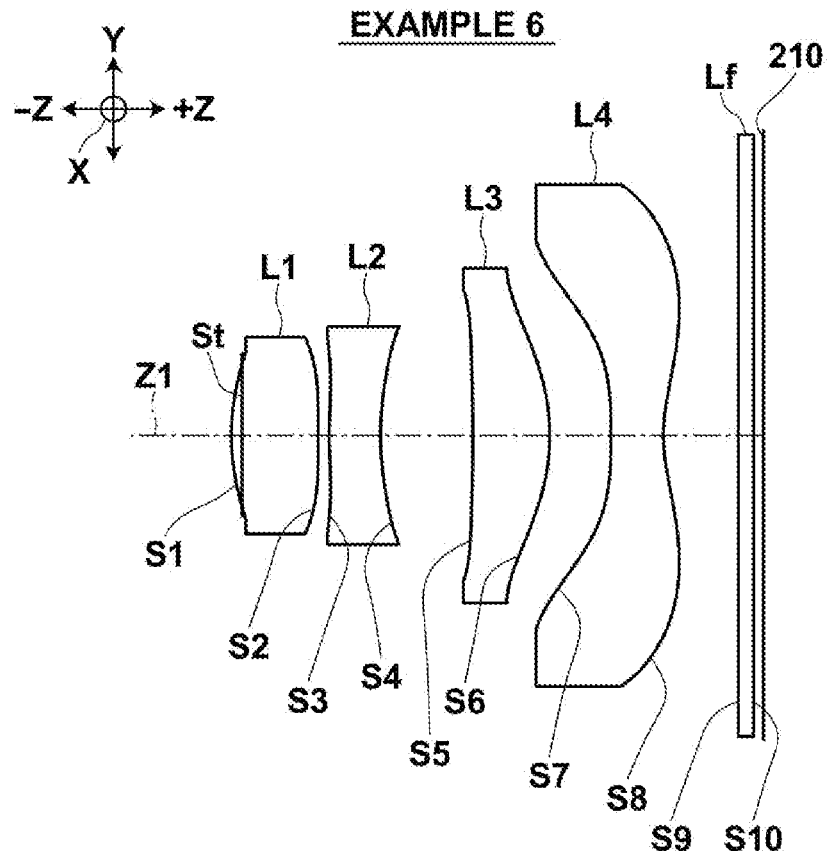
FIG. 9A is a diagram illustrating the structure of an imaging lens in Example 6.
Figure 9B:
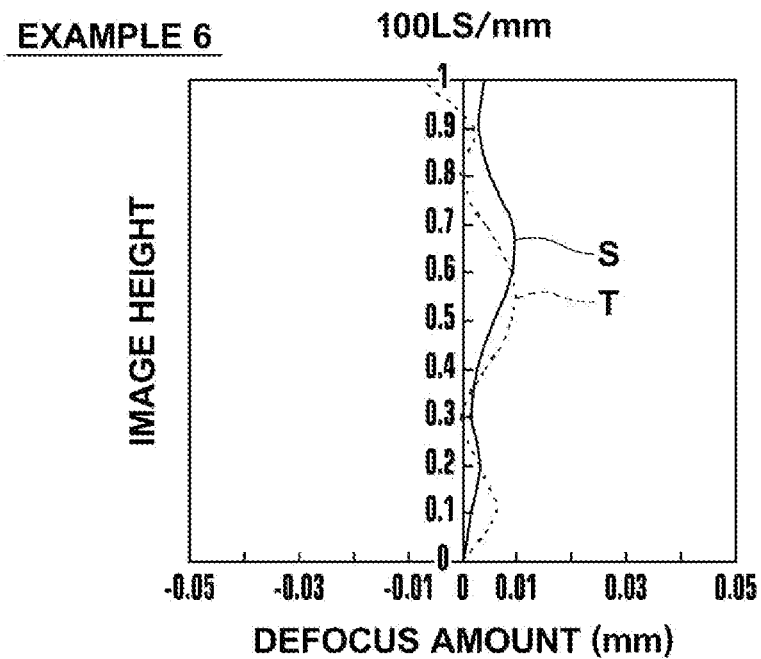
FIG. 9B is a diagram illustrating a defocus MTF peak curve related to the imaging lens in Example 6.
Figure 10A:
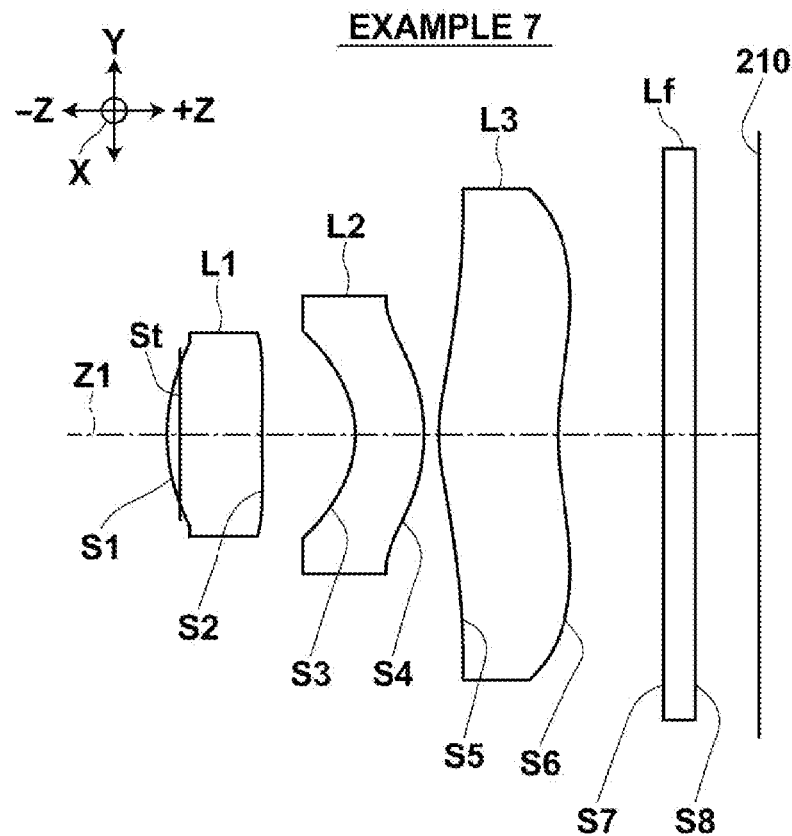
FIG. 10A is a diagram illustrating the structure of an imaging lens in Example 7.
Figure 10B:
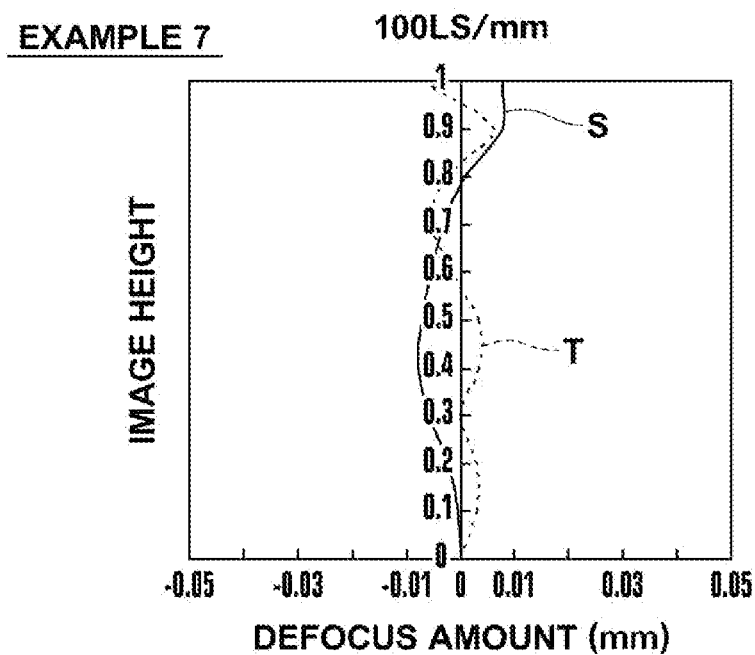
FIG. 10B is a diagram illustrating a defocus MTF peak curve related to the imaging lens in Example 7.

Hereinafter, embodiments of the present invention will be described with reference to drawings. FIG. 1 is a schematic diagram illustrating the structure of an imaging apparatus in which an imaging lens according to a first embodiment of the present invention is mounted, and the structure of an imaging apparatus in which an imaging lens according to a second embodiment of the present invention is mounted. FIG. 1 is common to both of the first and second imaging apparatuses. FIG. 2 is a diagram illustrating a defocus MTF peak curve, which will be described later. In FIG. 2, the vertical axis represents image heights, and the horizontal axis represents defocus amounts. FIG. 3 is a diagram illustrating a defocus MTF curve. In FIG. 3, peak positions on defocus MTF curves at respective image heights, as will be described later, are illustrated together on a coordinate plane, in which the vertical axis represents MTF values, and the horizontal axis represents defocus amounts.

FIG. 1 illustrates an imaging apparatus 300A according to a first embodiment of the present invention. The imaging apparatus 300A includes an imaging lens 100A and an imaging device 200 having an imaging surface 210. The imaging surface 210 is provided to image optical image 1K of an object 1 that has been formed through the imaging lens 100A. The imaging apparatus 300A may be applied to an information terminal apparatus, such as a cellular phone.

The imaging lens 100A according to the first embodiment of the present invention is an imaging lens for forming optical image 1K of the object 1 on the imaging surface 210 that is convex toward a light incident side.

More specifically, the imaging lens 100A is used in the imaging apparatus 300A that images optical image 1K of the object 1 formed on the imaging surface 210 that is convex toward a light incident side (in other words, the imaging surface 210 is convex toward the imaging lens 100A side). The imaging lens 100A is used to form the optical image 1K of the object 1 on the imaging surface 210 of the imaging device 200 included in the imaging apparatus 300A.

Here, the imaging surface 210 is defined as an area in which optical image 1K is formed through the imaging lens 100A, and the formed optical image 1K is imaged.

The imaging surface 210 has a curved shape (convex shape), and a position showing maximum image height Hmax in the imaging surface 210, which will be described later, is located further in a light-traveling direction, for example by 0.01 mm, than a center position 200C in the imaging surface 210, which will be described later. Here, the light-traveling direction is direction +Z in FIG. 1. The light-traveling direction is a direction moving away from the object 1. In other words, the light-traveling direction side is opposite to the object 1 side.

Further, the center position 200C is a position on the imaging surface 210, at which optical axis Z1 of the imaging lens 100A crosses the imaging surface 210.

Further, the maximum image height Hmax is a height (distance) from the optical axis Z1 (a position at which image height is 0%) to a position farthest from the optical axis Z1 in a direction orthogonal to the optical axis in the imaging surface 210, in which the optical image 1K is formed and imaged (for example, a position indicated by the sign "Yh" in FIG. 1).

FIG. 2 is a diagram illustrating a defocus MTF peak curve representing a change in defocus MTF peak positions depending on image heights. The defocus MTF peak curve is plotted in a coordinate plane defined by a vertical axis extending in a direction orthogonal to optical axis Z1 and a horizontal axis extending in the direction of optical axis Z1. The vertical axis represents an image height of optical image 1K formed on the imaging surface 210 through the imaging lens 100A, and the horizontal axis represents a defocus amount. Here, a defocus MTF peak position related to an optical image formed on the optical axis (image height=0 mm) is the origin of the coordinate plane.

A defocus MTF peak position at each image height may be obtained as a position (point) at which an MTF value becomes the highest on a defocus MTF curve illustrated in FIG. 3, which will be described later.

Each value related to MTF represented in the defocus MTF curve, the defocus MTF peak position, the defocus MTF peak curve, and the like has been obtained with respect to an object located at infinity having a spatial frequency of 100 LS/ram. Further, each of these values related to MTF are obtained by MTF measurement using white light. Further, optical simulation has been performed to match observation-side spectral sensitivity with visual sensitivity by adopting weighting for each wavelength as shown in Table 9 (optical design software: ZEMAX was used).

Table 9 is provided at the end of this section, i.e., "DESCRIPTION OF THE PREFERRED EMBODIMENTS".

The defocus MTF curve may be obtained, for example, in the following manner.

A chart (spatial frequency of the chart in a sagittal direction and in a tangential direction is 100 line-space/ram (LS/mm)) that is an object located at infinity is used as an object point, and an optical image representing the chart is formed on an orthogonal plane, which is orthogonal to the optical axis Z1, through the imaging lens 100A. Further, an MTF value related to the optical image representing the chart, which is formed at each image height on the orthogonal plane, is obtained. Further, while a distance between the imaging lens 100A and the orthogonal plane (a distance in the direction of the optical axis Z1) is changed, MTF values related to the optical image representing the chart, and which is formed at a predetermined image height on the orthogonal plane, are obtained continuously. Accordingly, a defocus MTF curve (a curve representing MTF values that change based on defocus amounts) for each image height (0%, 70%, 80%, 90% and 100%) of the optical image, which represents an object that is located at infinity and that has predetermined spatial frequency (100 LS/mm), is obtainable on a coordinate defined by a vertical axis representing MTF values and a horizontal axis representing defocus amounts.

The maximum value of MTF values in the defocus MTF curve, in other words, the maximum value of MTF values that change based on defocus amounts is a peak value of the defocus MTF curve.

In FIG. 3, signs "0S", "0.7S", "0.8S", "0.9S" and "1.0S" represent peak values of the defocus MTF curves for image heights of 0%, 70%, 80%, 90% and 100% in a sagittal direction, respectively.

Meanwhile, in FIG. 3, signs "0T", "0.7T", "0.8T", "0.9T" and "1.0T" represent peak values of the defocus MTF curves for image heights of 0%, 70%, 80%, 90% and 100% in a tangential direction, respectively.

The defocus MTF peak curve is obtainable by plotting the peak values of the defocus MTF curves at respective image heights, which are obtained as described above, on a coordinate plane illustrated in FIG. 2. Specifically, the defocus MTF peak curve is obtained by plotting a peak value of the defocus MTF curve at each image height on a coordinate plane defined by a vertical axis extending in a direction orthogonal to optical axis Z1, and which represents image heights, and a horizontal axis extending in the direction of the optical axis Z1, and which represents defocus amounts. In FIG. 2, the peak position of the defocus MTF curve on the optical axis (image height=0 mm) is the origin of the coordinate plane.

As the defocus MTF peak curve of FIG. 2 illustrates, a peak position of the defocus MTF curve in a sagittal direction (represented by the sign "S" in FIGS. 2 and 3) or a tangential direction (represented by the sign "T" in FIGS. 2 and 3) at an arbitrary image height included in a range of from 70% to 100% of maximum image height Hmax (the range of image heights is represented by the sign "Ja1") of optical image 1K formed on the imaging surface 210 through the imaging lens 100A is defined as peak position Pa1. The sign "Pa1" in FIG. 2 represents a defocus MTF peak position related to the tangential direction at an image height that is 85% of the maximum image height Hmax.

Further, a peak position of a same kind of defocus MTF curve at image height Ho (image height=0 mm: image height is 0% of the maximum image height Hmax) on the optical axis Z1 is defined as peak position Pao. The imaging lens 100A is constructed in such a manner that the peak position Pa1 is located further in the direction of travel of light (hereinafter, also referred to as a light-traveling direction) than the peak position Pao.

Here, MTF values related to the tangential direction are MTF values related to an optical image in which lines and spaces passing the optical axis appear alternately in radiation directions that are orthogonal to the optical axis. Meanwhile, MTF values related to the sagittal direction are MTF values related to an optical image in which lines and spaces appear alternately in a circumference direction with respect to the optical axis as a center.

Further, the expression "a same kind of defocus MTF peak position" means a defocus MTF peak position obtained when an object distance and a spatial frequency of the object are the same but an image height is different, as described already.

The imaging lens 100A may be constructed in such a manner that a defocus MTF peak position in a sagittal direction or a tangential direction at an arbitrary image height in a range of from 70% to 100% of maximum image height Hmax is located, by more than or equal to 0.005 mm and less than or equal to 0.025 mm, further in a light-traveling direction (direction +Z) than a same kind of defocus MTF peak position on an optical axis at which the image height is 0%.

Further, the imaging lens 100A may be constructed in such a manner that defocus MTF peak positions in a sagittal direction or a tangential direction at all image heights are located within a range of 0.02 mm in a light-traveling direction (direction +Z) from a same kind of defocus MTF peak position on an optical axis, at which an image height is 0%.

Next, actions of an imaging apparatus in which an imaging lens according to the first embodiment of the present invention is mounted will be described.

As the defocus MTF peak curve of FIG. 2 illustrates, when a defocus MTF peak position in a sagittal direction (represented by the sign "S" in FIGS. 2 and 3) or a tangential direction (represented by the sign "T" in FIGS. 2 and 3) at an arbitrary image height included in a range of from 70% to 100% of maximum image height Hmax of optical image 1K formed on the imaging surface 210 through the imaging lens 100A is located further in a light-traveling direction (direction +Z in FIG. 2) than a same kind of defocus MTF peak position on an optical axis, which is at image height Ho, there is a tendency that the amount of shift of a same kind of defocus MTF peak position in the light-traveling direction increases as the image height approaches the maximum image height Hmax from image height Ho (on the optical axis Z1).

As described above, with respect to an imaging lens to be mounted on an imaging apparatus, in which a reduction in size and high resolution are demanded, there is a characteristic that when defocus MTF peak positions are determined as described above, a defocus MTF peak curve substantially follows a surface that is convex toward a light incident side. The inventor of the present invention found this characteristic while designing lenses.

When the imaging lens 100A is constructed in such a manner that a defocus MTF peak position in a sagittal direction or a tangential direction at maximum image height Hmax is located further in a light-traveling direction than a same kind of defocus MTF peak position on an optical axis of the imaging lens 100A, it is possible to make the defocus MTF peak curve substantially follow a surface that is convex toward a light incident side, as described above.

Alternatively, when the imaging lens 100A is constructed in such a manner that a defocus MTF peak position in a sagittal direction or a tangential direction at an image height of 80% of maximum image height Hmax is located further in a light-traveling direction than a same kind of defocus MTF peak position on optical axis Z1, it is possible to make the defocus MTF peak curve substantially follow a surface that is convex toward a light incident side in a manner similar to the aforementioned cases.

The manner of determining the relationship between an image height and a defocus MTF peak position at the image height is not limited to the aforementioned examples. It is desirable that the relationship between an image height and a defocus MTF peak position at the image height is determined based on the shape of an imaging surface (the degree of deformation of the imaging surface).

Next, an imaging apparatus in which an imaging lens according to a second embodiment of the present invention is mounted will be described with reference to FIGS. 1 and 2 in a manner similar to the first embodiment. The same signs will be assigned to elements similar to the elements in the first embodiment, and detailed descriptions of such elements will be omitted.

An imaging apparatus 300B according to the second embodiment of the present invention illustrated in FIG. 1 includes an imaging lens 100B and an imaging device 200. The imaging device 200 has an imaging surface 210 for imaging optical image 1K of an object 1 formed through the imaging lens 100B. The imaging apparatus 300B may be applied to an information terminal apparatus, such as a cellular phone.

The imaging lens 100B according to the second embodiment of the present invention forms optical image 1K of the object 1 on the imaging surface 210 that is convex toward a light incident side.

More specifically, the imaging lens 100B is used in the imaging apparatus 300B that images optical image 1K of the object 1 formed on the imaging surface 210 that is convex toward a light incident side (in other words, the imaging surface 210 is convex toward the imaging lens 100B side). The imaging lens 100B is used to form the optical image 1K of the object 1 on the imaging surface 210 of the imaging device 200 included in the imaging apparatus 300B.

Here, as the defocus MTF peak curve of FIG. 2 illustrates, defocus MTF peak positions in a sagittal direction (represented by the sign "S" in FIGS. 2 and 3) or a tangential direction (represented by the sign "T" in FIGS. 2 and 3) at all of image heights included in a range of from 80% to 100% of maximum image height Hmax (the range of image heights is represented by the sign "Jb1") of optical image 1K formed on the imaging surface 210 through the imaging lens 100B are defined as peak position Pb1. The sign "Pb1" in FIG. 2 represents defocus MTF peak positions related to the sagittal direction at plural image heights that are different from each other in the range Jb1 of image heights.

Further, a same kind of defocus MTF peak position at image height Ho on optical axis Z1 is defined as peak position Pbo.

The imaging lens 100B is constructed in such a manner that the peak position Pb1 is located further in a light-traveling direction (direction +Z in FIG. 2, in other words, a direction moving away from the object 1) than the peak position Pbo.

When defocus MTF peak positions in a sagittal direction or a tangential direction at all of image heights included in a range of from 80% to 100% of maximum image height Hmax of optical image 1K formed on the imaging surface 210 through the imaging lens 100B are located further in a light-traveling direction (direction +Z in FIG. 2) than a same kind of defocus MTF peak position on optical axis Z1, which is at image height Ho, there is a tendency that the amount of shift of a same kind of defocus MTF peak position in the light-traveling direction increases as the image height approaches the maximum image height Hmax from image height Ho (on the optical axis Z1) in a manner similar to the imaging lens 100A. Therefore, it is possible to make the defocus MTF peak curve substantially follow a surface that is convex toward a light incident side.

Further, when the imaging lens 100B is constructed in such a manner that defocus MTF peak positions in a sagittal direction or a tangential direction at all of image heights in a range of from 70% to 100% of maximum image height Hmax are located further in a light-traveling direction than a same kind of defocus MTF peak position on an optical axis of the imaging lens 100B, it is possible to make the defocus MTF peak curve substantially follow a surface that is convex toward a light incident side in a manner similar to the aforementioned case.

Further, the imaging lens 100B may be constructed in such a manner that defocus MTF peak positions in a sagittal direction or a tangential direction at all of image heights in a range of from 80% to 100% of maximum image height Hmax are located, by more than or equal to 0.005 mm and less than or equal to 0.025 mm, further in a light-traveling direction (direction +Z) than a same kind of defocus MTF peak position on an optical axis of the imaging lens 100B at which the image height is 0%.

Further, it is desirable that the imaging lens 100B is constructed in such a manner that defocus MTF peak positions in a sagittal direction or a tangential direction at all image heights are located within a range of 0.02 mm in a light-traveling direction (direction +Z) from a same kind of defocus MTF peak position on an optical axis of the imaging lens 100B, at which an image height is 0%.

Figure 12A:
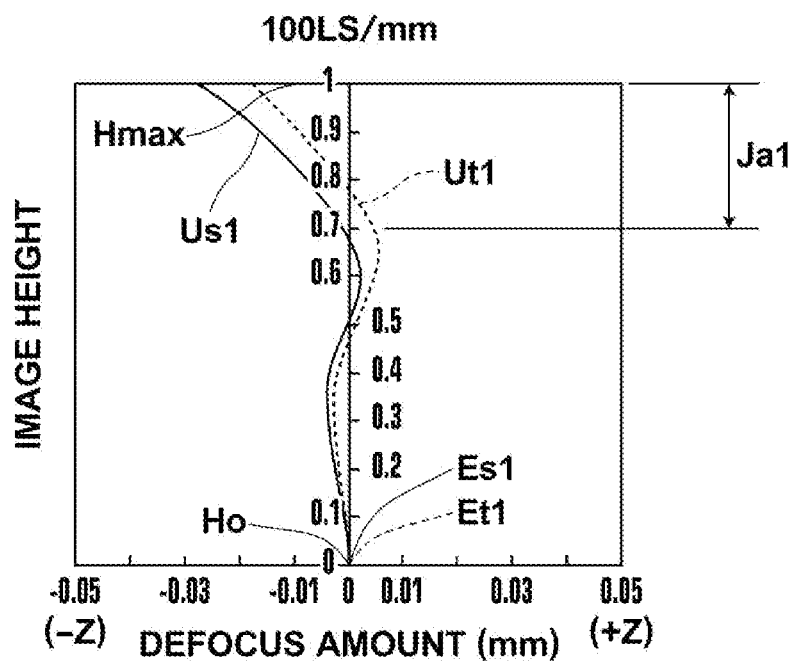
FIG. 12A is a diagram illustrating other defocus MTF peak curves in a first embodiment.

FIG. 12A is a diagram illustrating other defocus MTF peak curves in the first embodiment. In the coordinate system of FIG. 12A, the vertical axis represents image heights, and the horizontal axis represents defocus amounts.

As illustrated in FIG. 12A, defocus MTF peak curve Ut1, which is one of the defocus MTF peak curves, represents each peak position of a defocus MTF curve related to a tangential direction for maximum image height Hmax through image height Ho of an optical image formed through another imaging lens according to the first embodiment. Further, defocus MTF peak curve Us1, which is the other defocus MTF peak curve, represents each peak position of a defocus MTF curve related to a sagittal direction similar to the defocus MTF curve related to the tangential direction.

As already described, a position at image height Ho (image height=0 mm: the image height is 0% of maximum image height Hmax) coincides with optical axis Z1.

Further, position Et1 on defocus MTF peak curve Ut1 illustrated in FIG. 12A indicates a defocus MTF peak position (each peak position on a defocus MTF curve) related to a tangential direction at image height Ho. Further, position Es1 on defocus MTF peak curve Us1 indicates a defocus MTF peak position related to a sagittal direction at image height Ho.

Here, defocus MTF peak positions represented by the defocus MTF peak curve Ut1 related to the tangential direction satisfy a condition that a defocus MTF peak position at an arbitrary image height included in a range of from 70% to 100% of the maximum image height (the range indicated by the sign "Ja1" in FIG. 12A) is located further in a light-traveling direction (direction +Z in FIG. 12A) than a same kind of defocus MTF peak position (position Et1) at image height Ho (hereinafter, referred to as a first basic condition).

Meanwhile, defocus MTF peak positions represented by the defocus MTF peak curve Us1 related to the sagittal direction do not satisfy the first basic condition. Specifically, defocus MTF peak positions represented by the defocus MTF peak curve Us1 at all of image heights in a range of from 70% to 100% of the maximum image height are located further in a direction (direction −Z in FIG. 12A, and hereinafter, referred to as "object side") opposite to a light-traveling direction than a same kind of defocus MTF peak position (position Es1) at image height Ho.

Further, the defocus MTF peak position in the tangential direction at maximum image height Hmax represented by the defocus MTF peak curve Ut1 is located further on the object side than a same kind of defocus MTF peak position at image height Ho, and the defocus MTF peak position in the sagittal direction at maximum image height Hmax represented by the defocus MTF peak curve Us1 is located further on the object side than a same kind of defocus MTF peak position at image height Ho.

Further, the defocus MTF peak position in the tangential direction at 80% of maximum image height Hmax represented by the defocus MTF peak curve Ut1 is located further on the object side than a same kind of defocus MTF peak position at image height Ho, and the defocus MTF peak position in the sagittal direction at 80% of maximum image height Hmax represented by the defocus MTF peak curve Us1 is located further on the object side than a same kind of defocus MTF peak position at image height Ho.

Here, a case in which only the defocus MTF peak position represented by defocus MTF peak curve Ut1 related to the tangential direction satisfies the first basic condition has been described. Alternatively, another imaging lens according to the first embodiment may be constructed in such a manner that only the defocus MTF peak position represented by defocus MTF peak curve Us1 related to the sagittal direction satisfies the first basic condition.

Alternatively, another imaging lens according to the first embodiment may be constructed in such a manner that both of defocus MTF peak positions represented by defocus MTF peak curve Ut1 related to the tangential direction and defocus MTF peak positions represented by defocus MTF peak curve Us1 related to the sagittal direction satisfy the first basic condition.

Specifically, the "same kind of defocus MTF peak position" is a defocus MTF peak position when the type of direction (sagittal direction or tangential direction), an object distance, the spatial frequency of the object, and the like are the same, and only an image height is different.

Figure 12B:
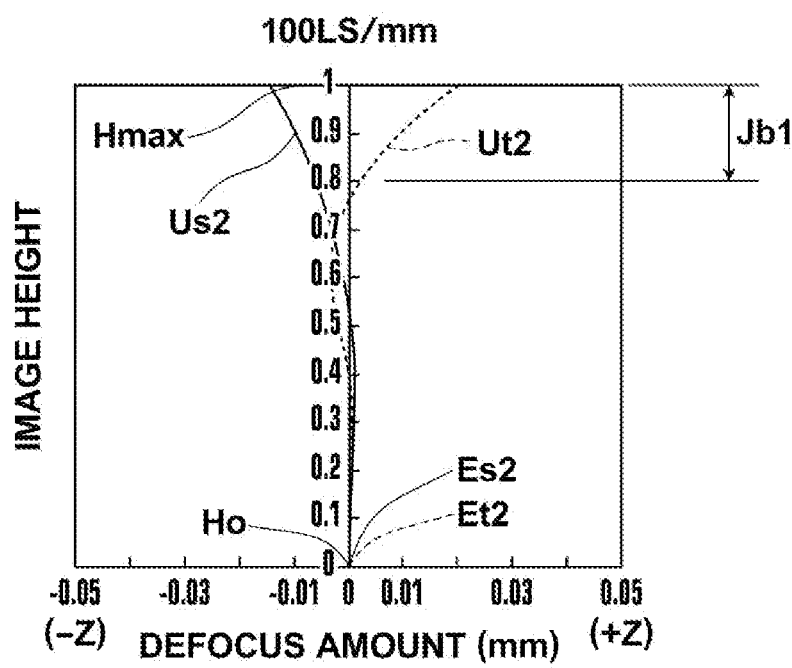
FIG. 12B is a diagram illustrating other defocus MTF peak curves in a second embodiment.

FIG. 12B is a diagram illustrating other defocus MTF peak curves in the second embodiment. In the coordinate system of FIG. 12B, the vertical axis represents image heights, and the horizontal axis represents defocus amounts.

As illustrated in FIG. 12B, defocus MTF peak curve Ut2, which is one of the defocus MTF peak curves, represents each peak position of a defocus MTF curve related to a tangential direction for maximum image height Hmax through image height Ho of an optical image formed through another imaging lens according to the second embodiment. Further, defocus MTF peak curve Us2, which is the other defocus MTF peak curve, represents each peak position of a defocus MTF curve related to a sagittal direction similar to the defocus MTF curve related to the tangential direction.

Further, position Et2 on defocus MTF peak curve Ut2 illustrated in FIG. 12B indicates a defocus MTF peak position related to a tangential direction at image height Ho. Further, position Es2 on defocus MTF peak curve Us2 indicates a defocus MTF peak position related to a sagittal direction at image height Ho.

Here, defocus MTF peak positions represented by the defocus MTF peak curve Ut2 related to the tangential direction satisfy a condition that defocus MTF peak positions at all of image heights in a range of from 80% to 100% of the maximum image height (the range indicated by the sign "Jb1" in FIG. 12B) are located further in a light-traveling direction (direction +Z in FIG. 123) than a same kind of defocus MTF peak position (position Et2) at image height Ho (hereinafter, referred to as a second basic condition).

Meanwhile, defocus MTF peak positions represented by the defocus MTF peak curve Us2 related to the sagittal direction do not satisfy the second basic condition. Specifically, defocus MTF peak positions represented by the defocus MTF peak curve Us2 at all of image heights in a range of from 80% to 100% of the maximum image height are located further on an object side (direction −Z in FIG. 12B) than a same kind of defocus MTF peak position (position Es2) at image height Ho.

Further, the defocus MTF peak curve Ut2 includes a part in which a defocus MTF peak position at an image height in a range of from 70% to 100% of the maximum image height is located further on an object side than a same kind of defocus MTF peak position at image height Ho, and the defocus MTF peak curve Us2 includes a part in which a defocus MTF peak position at an image height in a range of from 70% to 100% of the maximum image height is located further on an object side than a same kind of defocus MTF peak position at image height Ho.

Here, a case in which only the defocus MTF peak positions represented by defocus MTF peak curve Ut2 related to the tangential direction satisfy the second basic condition has been described. Alternatively, another imaging lens according to the second embodiment may be constructed in such a manner that only the defocus MTF peak positions represented by defocus MTF peak curve Us2 related to the sagittal direction satisfy the second basic condition.

Alternatively, another imaging lens according to the second embodiment may be constructed in such a manner that both of defocus MTF peak positions represented by defocus MTF peak curve Ut2 related to the tangential direction and defocus MTF peak positions represented by defocus MTF peak curve Us2 related to the sagittal direction satisfy the second basic condition.

As the imaging lens 100A according to the first embodiment and the imaging lens 100B according to the second embodiment, an imaging lens as described below may be adopted.

Specifically, the imaging lens 100A, 100B may be composed of first lens L1 having positive power, second lens L2, third lens L3 having positive power and fourth lens L4, which are arranged in this order from an object side of the imaging lens. Further, the imaging lens 100A, 100B may satisfy the following formulas (1) and (2) at the same time:

$$0.49 < f1/f < 1.0 \quad (1); \text{ and}$$

$$0.5 < f3/f < 3.0 \quad (2), \text{ where}$$

f is the focal length of the entire system of the imaging lens,
f1 is the focal length of first lens L1, and
f3 is the focal length of third lens L3.

Formula (1) is related to the focal length of first lens L1. When the imaging lens is constructed in such a manner that the value of f1/f is lower than the lower limit defined by the formula (1), the power of the first lens L1 becomes too strong, and spherical aberrations increase.

In contrast, when the imaging lens is constructed in such a manner that the value of f1/f exceeds the upper limit defined by the formula (1), it becomes difficult to reduce the length of the entire lens system. Further, correction of curvature of field and astigmatism becomes difficult.

Formula (2) is related to the focal length of third lens L3. When the imaging lens is constructed in such a manner that the value of f3/f is lower than the lower limit defined by the formula (2), the positive power of the third lens L3 becomes too strong, and the optical performance as a whole becomes lower. Further, it becomes difficult to provide a sufficient back focus.

In contrast, when the imaging lens is constructed in such a manner that the value of f3/f exceeds the upper limit defined by the formula (2), the positive power of the third lens L3 becomes too weak, and correction of aberrations becomes difficult.

Further, when the imaging lens satisfies formula (3): 0.49<f1/f<0.69 and formula (4): 0.7<f3/f<2.0 in addition to the formulas (1) and (2), more desirable optical performance is obtainable.

SPECIFIC EXAMPLES

With reference to FIGS. 4A, 4B through 10A, 10B and 11 and Tables 1 through 8, numerical data or the like in Examples 1 through 7 of the present invention will be described together. In FIGS. 4A through 10A, the same signs as those used in FIG. 1, which illustrates the imaging lens 100A and the imaging lens 100B, represent corresponding elements.

FIGS. 4A through 10A are schematic cross sections illustrating the structures of the imaging lenses in Examples 1 through 7, respectively. In each of the cross sections, the imaging surface 210 is curved, and convex toward a light incident side in a manner similar to the aforementioned cases.

Further, FIGS. 4B through 10B are diagrams illustrating defocus MTF peak curves as described above related to the imaging lenses in Examples 1 through 7, respectively. These defocus MTF peak curves are obtained with respect to an object that is located at infinity and that has a spatial frequency of 100 LS/mm in a manner similar to the aforementioned cases. Further, optical simulation is performed to match observation-side spectral sensitivity with visual sensitivity in MTF measurement using white light. Simulation is performed by adopting weighting for each wavelength as shown in Table 9.

In FIGS. 4A through 10A, signs "L1", "L2", "L3" and "L4" represent lenses, and the numbers in these signs correspond to the order of arrangement of the lenses from the object side.

Sign "St" represents an aperture stop. The sign "Lf" represents a filter for blocking unwanted light entering the imaging surface 210. The filter Lf arranged next to the imaging surface 210 is a parallel flat plate. Further, a filter having a function of a low-pass filter, an infrared-ray-cut filter or the like may be adopted as the filter Lf.

Figure 11:
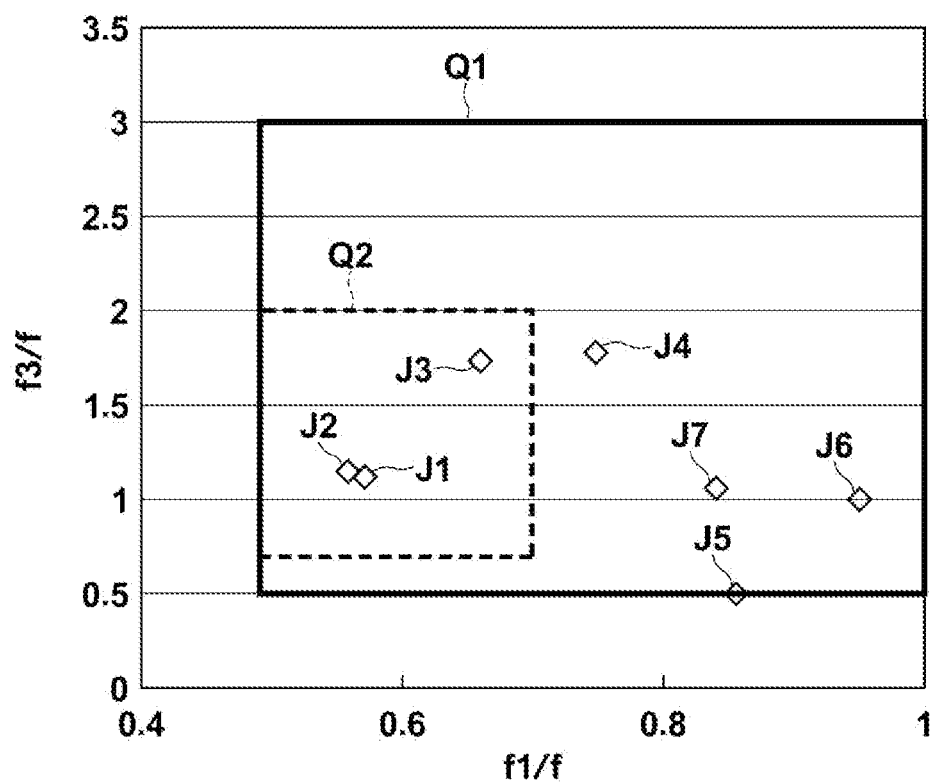
FIG. 11 is a diagram illustrating degrees of satisfying formulas with respect to the imaging lenses in Examples 1 through 7.

FIG. 11 is a diagram illustrating a coordinate plane defined by a horizontal axis representing the value of f1/f related to the formulas (1) and (3) and a vertical axis representing the value of f3/f related to the formulas (2) and (4). In FIG. 11, desirable range Q1 that satisfies both of the formulas (1) and (2), a more desirable range Q2 that satisfies both of the formulas (3) and (4) and points J1 through J7 are illustrated in the coordinate plane. The points J1 through J7 are determined on the coordinate plane based on the values of f1/f and the values of f3/f related to the imaging lenses in Examples 1 through 7 (please refer to Table 8, which will be described later).

Here, points J1, J2, J3, J4, J5, J6 and J7 correspond to Examples 1 through 7, respectively.

As FIG. 11 illustrates, Examples 1 through 7 (points J1 through J7) are included in the desirable range Q1. Further, Examples 1, 2 and 3 (points J1, J2 and J3) are included in the more desirable range Q2.

Tables 1 through 7 show basic data about the imaging lenses in Examples 1 through 7, respectively. In Tables 1 through 7, an upper part of each table (indicated by the sign (a)) shows lens data, and a lower part of each table (indicated by the sign (b)) shows aspheric data. The aspheric data correspond to aspheric coefficients K, A3, A4 ... of lens surfaces represented by surface numbers Si in the lens data indicated by the sign (a).

Here, the following aspheric surface equation is used:

$$Z = \frac{Y^2/R}{1+(1-K \cdot Y^2/R^2)^{1/2}} + \sum_{i=3}^{n} AiY^i, \quad \text{[EQUATION 1]}$$

where

Z: the depth of an aspheric surface (the length of a perpendicular from a point on the aspheric surface at height Y to a flat plane in contact with the vertex of the aspheric surface, the flat plane being perpendicular to an optical axis) (mm), Y: height (a distance from the optical axis) (mm), R: a paraxial radius of curvature (mm), and K, Ai: aspheric coefficient (i=3 through n).

Further, Table 8 shows values defined by formulas (1) and (2) with respect to the imaging lenses in Examples 1 through 7 (values calculated for respective examples by using arithmetic expressions in the inequations).

In Tables 1 through 7, focal length f of entire lens system, and F-number Fno. are shown at the top of lens data indicated by the sign (a).

In the lens data indicated by the sign (a) in Tables 1 through 7, surface number Si is the number of an i-th lens surface (i=1, 2, 3 ... ). The surface number of the most-object-side surface is 1, and surface numbers Si sequentially increase from the object side toward the image side. The lens data do not include the surface number of the aperture stop St. However, the lens data include surfaces related to the filter Lf.

Further, radius Ri of curvature is the radius of curvature of the i-th surface (i=1, 2, 3 ... ). Distance Di between surfaces (i=1, 2, 3 ... ) is a distance, on optical axis Z1, between the i-th surface and the (i+1)th surface. The sign "Ri" and the sigh "Di" in the lens data correspond to the sign Si, representing the lens surface or the like (i=1, 2, 3 ... ).

Further, the lens data show refractive index Ndj of a j-th optical element (j=1, 2, 3 ... ) with respect to d-line (wavelength is 587.6 nm). The number of j sequentially increases from the object side toward the image side. Further, the lens data show Abbe number vdj of the j-th optical element with respect to d-line.

In the lens data of Tables 1 through 7, the radius of curvature and the distance between surfaces are represented by the unit of mm. The radius of curvature is positive when the surface is convex toward the object side. The radius of curvature is negative when the surface is convex toward the image side.

Tables 1 through 8 are provided at the end of this section, i.e., "DESCRIPTION OF THE PREFERRED EMBODIMENTS".

So far, embodiments related to the imaging lens of the present invention, the imaging apparatus including the imaging lens and the information terminal apparatus including the imaging apparatus have been described. However, the present invention is not limited to the embodiments. Various modifications are possible without departing from the gist of the present invention. For example, the values of the radius of curvature of each lens, a distance between surfaces, a refractive index and the like are not limited to the values in the tables, and may be other values.

TABLE 1

EXAMPLE 1

(a)
f = 4.905 FNo. = 2.80
LENS DATA

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| (STOP) St | ∞ | −0.15 | | |
| 1 | 1.548 | 0.696 | 1.510 | 56.45 |
| 2 | −10.652 | 0.102 | | |
| 3 | −15.482 | 0.445 | 1.614 | 25.3 |
| 4 | 3.724 | 0.877 | | |
| 5 | −3.700 | 1.156 | 1.534 | 55.89 |
| 6 | −1.644 | 0.226 | | |
| 7 | 100.000 | 0.586 | 1.534 | 55.89 |
| 8 | 1.716 | 0.547 | | |
| 9 | ∞ | 0.300 | 1.516 | 64.14 |
| 10 | ∞ | 0.442 | | |

(b)

| ASPHERIC COEFFICIENT | ASPHERIC DATA | | | |
|---|---|---|---|---|
| | FIRST SURFACE | SECOND SURFACE | THIRD SURFACE | FOURTH SURFACE |
| K | 5.89037700E−02 | 9.90000000E+01 | 4.94114730E+01 | 1.26069529E+01 |
| A3 | 5.73124538E−03 | −3.53601507E−03 | 1.07783752E−02 | 3.45852526E−02 |
| A4 | 8.19049264E−03 | 6.33160588E−02 | 1.77796553E−02 | −8.11576161E−02 |
| A5 | 5.04580945E−02 | −8.19974002E−02 | −2.48920051E−02 | 1.56081941E−01 |
| A6 | −7.77059084E−02 | 1.77234283E−02 | 8.07027444E−02 | −1.00743980E−01 |
| A7 | 7.72221500E−02 | 8.02947673E−02 | −1.05388519E−01 | −2.79362270E−02 |
| A8 | −3.75285224E−02 | −1.25671633E−01 | −8.13069661E−02 | 2.12083243E−02 |
| A9 | 2.06149878E−02 | −4.34779959E−02 | 9.08157400E−02 | 2.85589159E−02 |
| A10 | −2.95137893E−02 | 7.70500356E−02 | 1.97571846E−02 | 1.65927247E−04 |

| ASPHERIC COEFFICIENT | ASPHERIC DATA | | | |
|---|---|---|---|---|
| | FIFTH SURFACE | SIXTH SURFACE | SEVENTH SURFACE | EIGHTH SURFACE |
| K | 9.92050678E+00 | −8.06230544E+00 | −5.00000000E+01 | −6.90198860E+00 |
| A3 | 1.24193224E−03 | −1.70145682E−01 | −2.07757786E−01 | −9.00109492E−02 |
| A4 | −5.29959906E−02 | 1.78811867E−03 | 6.43148814E−02 | 3.16189836E−02 |
| A5 | 2.26056451E−02 | 5.24083596E−02 | −7.55457843E−03 | −3.54294202E−02 |
| A6 | −4.18119857E−03 | −1.10938556E−02 | 7.01731478E−03 | 3.03001592E−02 |
| A7 | −3.52586558E−02 | −8.71282860E−03 | 6.90089780E−03 | −1.20545892E−02 |
| A8 | 7.02814341E−03 | −1.26335568E−03 | −3.13049206E−03 | 6.57538683E−04 |
| A9 | 3.20788047E−02 | 2.99933769E−03 | −1.07285815E−03 | 7.76299108E−04 |
| A10 | −2.78385586E−02 | 2.24507331E−05 | 3.50210112E−04 | −1.60567094E−04 |
| A11 | | | 9.69958151E−06 | 1.43683388E−06 |
| A12 | | | 8.29621816E−06 | 7.19381761E−07 |
| A13 | | | 3.32465934E−06 | −1.61936307E−07 |
| A14 | | | 1.14245069E−06 | −4.64467585E−08 |
| A15 | | | −3.66925184E−07 | 4.22598933E−08 |
| A16 | | | −2.85418117E−07 | 2.39931735E−08 |

TABLE 2

EXAMPLE 2

(a)
f = 4.927 FNo. = 2.80
LENS DATA

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| (STOP) St | ∞ | −0.20 | | |
| 1 | 1.519 | 0.687 | 1.510 | 56.45 |
| 2 | −10.244 | 0.102 | | |
| 3 | −11.741 | 0.417 | 1.614 | 25.3 |
| 4 | 3.987 | 0.879 | | |
| 5 | −3.230 | 1.157 | 1.534 | 55.89 |

TABLE 2-continued

EXAMPLE 2

| | | | | |
|---|---|---|---|---|
| 6 | −1.619 | 0.225 | | |
| 7 | 100.000 | 0.625 | 1.534 | 55.89 |
| 8 | 1.744 | 0.547 | | |
| 9 | ∞ | 0.300 | 1.516 | 64.14 |
| 10 | ∞ | 0.445 | | |

(b)

| ASPHERIC COEFFICIENT | ASPHERIC DATA | | | |
|---|---|---|---|---|
| | FIRST SURFACE | SECOND SURFACE | THIRD SURFACE | FOURTH SURFACE |
| K | 2.33931540E−01 | 9.90000000E+01 | 4.94114730E+01 | 1.55220760E+01 |
| A3 | 3.22824978E−03 | −5.39893268E−03 | 9.92691339E−03 | 3.44149690E−02 |
| A4 | 1.50182692E−02 | 7.91822018E−02 | 4.59336870E−02 | −6.80211372E−02 |
| A5 | 3.84679590E−02 | −7.94468041E−02 | −3.24320532E−02 | 1.57832267E−01 |
| A6 | −8.44074585E−02 | 5.07474686E−03 | 7.15244833E−02 | −1.07164138E−01 |
| A7 | 8.35244711E−02 | 7.56803707E−02 | −1.05903962E−01 | −3.10725069E−02 |
| A8 | −2.21804954E−02 | −1.17618644E−01 | −7.87390826E−02 | 2.64893337E−02 |
| A9 | 2.81000220E−02 | −3.36223731E−02 | 9.29767210E−03 | 2.79160102E−02 |
| A10 | −5.04004382E−02 | 6.31297612E−02 | 1.45181275E−02 | −1.28071040E−03 |

| ASPHERIC COEFFICIENT | ASPHERIC DATA | | | |
|---|---|---|---|---|
| | FIFTH SURFACE | SIXTH SURFACE | SEVENTH SURFACE | EIGHTH SURFACE |
| K | 7.77452581E+00 | −7.03270868E+00 | −5.00000000E+01 | −7.37618128E+00 |
| A3 | −9.20793064E−04 | −1.63044643E−01 | −2.08460388E−01 | −8.80998496E−02 |
| A4 | −4.62512329E−02 | −3.99798971E−03 | 6.46730301E−02 | 3.09233469E−02 |
| A5 | 1.86562900E−02 | 5.10116756E−02 | −7.71027651E−03 | −3.52050159E−02 |
| A6 | −9.40218991E−03 | −1.15116253E−02 | 6.82272135E−03 | 3.03450271E−02 |
| A7 | −3.79102187E−02 | −8.96230933E−03 | 6.79255299E−03 | −1.20695604E−02 |
| A8 | 1.02471205E−02 | −1.30636189E−03 | −3.16899430E−03 | 6.44024574E−04 |
| A9 | 3.76472946E−02 | 3.14691744E−03 | −1.08076889E−03 | 7.71279581E−04 |
| A10 | −3.21032729E−02 | 2.74393865E−04 | 3.53143722E−04 | −1.61355248E−04 |
| A11 | | | 1.32832084E−05 | 1.17213121E−06 |
| A12 | | | 1.12617459E−05 | 6.25096875E−07 |
| A13 | | | 5.81788607E−06 | −1.74349375E−07 |
| A14 | | | 1.61956308E−06 | −7.56092540E−08 |
| A15 | | | −5.96309522E−07 | 4.16264616E−08 |
| A16 | | | −4.99019508E−07 | 4.08191207E−08 |

TABLE 3

EXAMPLE 3

(a)
f = 4.916 FNo. = 2.80
LENS DATA

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| (STOP) St | ∞ | −0.13 | | |
| 1 | 1.669 | 0.807 | 1.531 | 55.35 |
| 2 | 56.301 | 0.100 | | |
| 3 | 8.065 | 0.479 | 1.614 | 25.3 |
| 4 | 2.492 | 0.905 | | |
| 5 | −9.433 | 1.040 | 1.531 | 55.35 |
| 6 | −2.932 | 0.539 | | |
| 7 | −997.097 | 0.494 | 1.510 | 56.45 |
| 8 | 2.311 | 0.700 | | |
| 9 | ∞ | 0.145 | 1.516 | 64.14 |
| 10 | ∞ | 0.077 | | |

(b)

| ASPHERIC COEFFICIENT | ASPHERIC DATA | | | |
|---|---|---|---|---|
| | FIRST SURFACE | SECOND SURFACE | THIRD SURFACE | FOURTH SURFACE |
| K | 1.66186040E−01 | −9.90000000E+01 | 1.81856950E−01 | −2.34371313E+00 |
| A3 | −2.55993177E−03 | −5.25647753E−03 | −1.54517461E−02 | 3.07822372E−02 |

TABLE 3-continued

EXAMPLE 3

| | | | | |
|---|---|---|---|---|
| A4 | 3.39153256E−02 | 2.72968579E−03 | 4.45247606E−02 | −6.38293342E−02 |
| A5 | −1.26077568E−02 | 1.90819216E−02 | −9.67671358E−02 | 2.37006602E−01 |
| A6 | −3.74890419E−02 | −9.54273589E−02 | 7.49713066E−02 | −1.63457088E−01 |
| A7 | 1.01435807E−01 | 3.35552254E−03 | −1.22715958E−01 | −7.02305255E−02 |
| A8 | −8.35839563E−02 | −4.07083161E−02 | −5.64327635E−02 | 6.04908006E−02 |
| A9 | 2.62850518E−02 | 1.23585151E−01 | 1.86340646E−01 | 9.07732932E−02 |
| A10 | −9.03848751E−03 | −7.37130151E−02 | −8.45130606E−02 | −4.78779928E−02 |

| ASPHERIC | ASPHERIC DATA | | | |
|---|---|---|---|---|
| COEFFICIENT | FIFTH SURFACE | SIXTH SURFACE | SEVENTH SURFACE | EIGHTH SURFACE |
| K | −1.00018192E+01 | −5.00007642E+01 | −9.00000000E+01 | −9.46587261E+00 |
| A3 | −9.46040998E−03 | −1.81496725E−01 | −1.81648339E−01 | −9.86405231E−02 |
| A4 | −3.58971053E−02 | 4.10179562E−03 | −2.77333797E−02 | 1.69107875E−02 |
| A5 | 1.19953996E−02 | 6.79450116E−02 | −9.70248729E−03 | −2.71555647E−02 |
| A6 | 3.58496127E−02 | −2.96044194E−02 | 1.71259815E−02 | 2.62429484E−02 |
| A7 | −7.71056863E−02 | −1.41404015E−02 | 1.05380589E−02 | −1.47509003E−02 |
| A8 | 4.55743492E−03 | 5.93030714E−03 | −2.84802002E−03 | 2.04719373E−03 |
| A9 | 5.89604885E−02 | 7.98386553E−03 | −1.23426585E−03 | 1.38676493E−03 |
| A10 | −3.15370223E−02 | −3.19914563E−03 | 2.23804184E−04 | −4.40888900E−04 |
| A11 | | | | |
| A12 | | | | |
| A13 | | | | |
| A14 | | | | |
| A15 | | | | |
| A16 | | | | |

TABLE 4

EXAMPLE 4

(a)
f = 5.340 FNo. = 3.20
LENS DATA

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| (STOP) St | ∞ | −0.15 | | |
| 1 | 2.020 | 1.171 | 1.542 | 62.9 |
| 2 | 25.164 | 0.850 | | |
| 3 | −1.756 | 0.601 | 1.606 | 26.92 |
| 4 | −7.591 | 0.104 | | |
| 5 | 5.004 | 0.997 | 1.510 | 55.95 |
| 6 | −31.054 | 0.160 | | |
| 7 | 2.016 | 0.890 | 1.510 | 55.95 |
| 8 | 1.717 | 0.700 | | |
| 9 | ∞ | 0.300 | 1.516 | 64.14 |
| 10 | ∞ | 0.530 | | |

(b)

| ASPHERIC | ASPHERIC DATA | | | |
|---|---|---|---|---|
| COEFFICIENT | FIRST SURFACE | SECOND SURFACE | THIRD SURFACE | FOURTH SURFACE |
| K | 2.13604104E+00 | −1.00132522E+01 | 1.81891161E+00 | 2.80872939E+00 |
| A3 | −3.46981294E−03 | −5.42305887E−03 | −1.12346345E−02 | −9.86524809E−02 |
| A4 | −3.57904549E−03 | −1.36329705E−02 | −7.04348331E−02 | −8.98006072E−02 |
| A5 | −4.05552522E−02 | 1.51704614E−03 | 1.11274893E−01 | 1.37539709E−01 |
| A6 | 2.30184257E−02 | −2.23616215E−02 | −6.37816852E−03 | 7.52898415E−03 |
| A7 | 9.42217459E−03 | −2.60467478E−03 | −4.26819018E−02 | −2.89838227E−02 |
| A8 | −1.02821100E−02 | 1.26255412E−02 | 5.79574814E−03 | −5.10112651E−03 |
| A9 | −2.73604112E−02 | −7.99698527E−03 | 4.61439213E−02 | 8.17979830E−03 |
| A10 | 1.51543552E−02 | −6.31537751E−03 | −3.88742079E−02 | −7.23593624E−04 |

| ASPHERIC | ASPHERIC DATA | | | |
|---|---|---|---|---|
| COEFFICIENT | FIFTH SURFACE | SIXTH SURFACE | SEVENTH SURFACE | EIGHTH SURFACE |
| K | −5.00325618E+01 | 1.00137761E+01 | −8.60851329E+00 | −5.25127618E+00 |
| A3 | −1.16050583E−01 | −6.48405520E−03 | 2.12271851E−02 | 3.78978624E−02 |

TABLE 4-continued

EXAMPLE 4

| | | | | |
|---|---|---|---|---|
| A4 | 7.50999010E−02 | −1.32834533E−02 | −6.28917304E−02 | −8.02845136E−02 |
| A5 | 7.68197715E−03 | −2.40058900E−03 | −4.45104871E−03 | 2.78058040E−02 |
| A6 | −1.10986388E−02 | 9.03168356E−04 | 2.97893208E−03 | −3.63084558E−03 |
| A7 | −9.90330038E−03 | −1.03752524E−03 | 2.75785534E−03 | −1.22948762E−03 |
| A8 | 8.09634292E−04 | −4.99750447E−04 | −5.68987297E−04 | 4.54824407E−04 |
| A9 | 3.97349515E−03 | 4.01040165E−04 | −8.67469308E−05 | 8.12492402E−05 |
| A10 | −1.24372645E−03 | −4.68245771E−05 | 3.19517891E−05 | −4.12390539E−05 |
| A11 | | | | |
| A12 | | | | |
| A13 | | | | |
| A14 | | | | |
| A15 | | | | |
| A16 | | | | |

TABLE 5

EXAMPLE 5

(a)
f = 5.379 FNo. = 2.77
LENS DATA

| Si (SURFACE NUMBER) | Ri (RADIUS OF CURVATURE) | Di (DISTANCE BETWEEN SURFACES) | Ndj (REFRACTIVE INDEX) | νdj (Abbe NUMBER) |
|---|---|---|---|---|
| (STOP) St | ∞ | −0.10 | | |
| 1 | 3.089 | 1.223 | 1.510 | 55.94 |
| 2 | −7.354 | 0.121 | | |
| 3 | 25.493 | 0.517 | 1.614 | 25.3 |
| 4 | 4.605 | 1.078 | | |
| 5 | −7.254 | 1.100 | 1.510 | 55.94 |
| 6 | −1.258 | 0.120 | | |
| 7 | ∞ | 0.830 | 1.510 | 55.94 |
| 8 | 1.243 | 0.761 | | |
| 9 | ∞ | 0.300 | 1.516 | 64.14 |
| 10 | ∞ | 0.757 | | |

(b)

| ASPHERIC COEFFICIENT | ASPHERIC DATA | | | |
|---|---|---|---|---|
| | FIRST SURFACE | SECOND SURFACE | THIRD SURFACE | FOURTH SURFACE |
| K | 8.05327870E−01 | −1.65608796E+01 | −1.61721793E+01 | −1.16608507E+01 |
| A3 | 1.04397042E−03 | −1.79589397E−02 | −2.03973254E−02 | 2.15466907E−02 |
| A4 | −3.85458723E−03 | −1.35892457E−03 | −9.37019288E−03 | −6.61700763E−02 |
| A5 | −5.66944802E−03 | −2.36939373E−02 | −2.30935830E−02 | 8.46452414E−02 |
| A6 | 2.89066417E−04 | 1.62764254E−04 | 2.43423864E−02 | −3.88634900E−02 |
| A7 | 2.97777043E−04 | 2.67603757E−03 | −2.42815006E−02 | −1.93803363E−02 |
| A8 | 8.14431963E−04 | 1.05874807E−03 | −1.01633673E−02 | 9.98467572E−03 |
| A9 | −2.37032542E−03 | −5.92070698E−04 | 3.15010331E−02 | 9.76972942E−03 |
| A10 | 6.53538824E−04 | 1.10173823E−03 | −1.08097223E−02 | −4.52591388E−03 |

| ASPHERIC COEFFICIENT | ASPHERIC DATA | | | |
|---|---|---|---|---|
| | FIFTH SURFACE | SIXTH SURFACE | SEVENTH SURFACE | EIGHTH SURFACE |
| K | 9.09542889E+00 | −4.63604545E+00 | 0.00000000E+00 | −5.49969716E+00 |
| A3 | 1.31471244E−02 | −9.71371580E−02 | −6.54392078E−02 | 1.40348227E−02 |
| A4 | −1.27339083E−02 | 7.47003894E−02 | 3.30573155E−03 | −6.50951213E−02 |
| A5 | −2.09778723E−03 | 1.62570846E−02 | −8.89241299E−03 | 3.13878778E−02 |
| A6 | 1.00025048E−02 | −3.02121888E−03 | 2.16529564E−03 | −4.39667179E−03 |
| A7 | −3.48579925E−03 | −8.00999138E−04 | 2.52326263E−03 | −1.30838204E−03 |
| A8 | −1.72474871E−03 | 4.68693990E−04 | −3.00653760E−04 | 2.44001235E−04 |
| A9 | 1.99967945E−03 | 6.04952626E−04 | −9.12013056E−05 | 1.08201814E−04 |
| A10 | −8.65648964E−04 | −9.36867075E−05 | −2.26002462E−06 | −2.63826249E−05 |
| A11 | | | | |
| A12 | | | | |
| A13 | | | | |
| A14 | | | | |
| A15 | | | | |
| A16 | | | | |

TABLE 6

EXAMPLE 6

(a)
f = 4.383 FNo. = 2.82
LENS DATA

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| (STOP) St | ∞ (STOP) | −0.10 | | |
| 1 | 2.144 | 0.811 | 1.531 | 55.35 |
| 2 | 77.158 | 0.105 | | |
| 3 | 4.650 | 0.479 | 1.614 | 25.3 |
| 4 | 2.922 | 0.861 | | |
| 5 | −25.222 | 0.722 | 1.531 | 55.35 |
| 6 | −2.171 | 0.571 | | |
| 7 | −3122.258 | 0.490 | 1.510 | 56.45 |
| 8 | 1.410 | 0.700 | | |
| 9 | ∞ | 0.145 | 1.516 | 64.14 |
| 10 | ∞ | 0.095 | | |

(b)

| ASPHERIC COEFFICIENT | ASPHERIC DATA | | | |
|---|---|---|---|---|
| | FIRST SURFACE | SECOND SURFACE | THIRD SURFACE | FOURTH SURFACE |
| K | −2.08522540E−01 | −9.50000000E+01 | −4.81598152E+01 | −8.32233935E+00 |
| A3 | −7.31995176E−03 | −1.41214182E−03 | −2.45883669E−02 | 3.21839616E−02 |
| A4 | 3.27280446E−02 | −2.57447608E−01 | −9.79237139E−02 | −1.17983495E−01 |
| A5 | −8.04421565E−02 | 4.70260226E−02 | −1.57946674E−01 | 1.92888913E−01 |
| A6 | −3.78786428E−03 | 1.03952131E−02 | 1.26063937E−01 | −1.39044794E−01 |
| A7 | 1.41331892E−02 | 4.51540961E−02 | −2.86298543E−03 | −3.34316856E−02 |
| A8 | −1.23639636E−01 | −3.06004637E−02 | 3.91443876E−02 | 7.11058907E−02 |
| A9 | −5.04518003E−02 | 1.29644580E−01 | 1.85269706E−01 | 8.22190242E−02 |
| A10 | 4.60376783E−02 | −1.13452931E−01 | −1.64947677E−01 | −6.63104059E−02 |

| ASPHERIC COEFFICIENT | ASPHERIC DATA | | | |
|---|---|---|---|---|
| | FIFTH SURFACE | SIXTH SURFACE | SEVENTH SURFACE | EIGHTH SURFACE |
| K | −9.79535353E+00 | −4.00660728E+01 | −8.90000000E+01 | −6.55869342E+00 |
| A3 | 1.98600640E−02 | −2.04285211E−01 | −1.94538083E−01 | −1.08121263E−01 |
| A4 | −5.86854190E−02 | 2.25232868E−02 | −2.72844684E−02 | 2.65223774E−02 |
| A5 | 3.92338205E−02 | 8.87074807E−02 | −7.32319335E−03 | −2.00435829E−02 |
| A6 | 6.00006279E−02 | −2.42952872E−02 | 1.94275995E−02 | 2.34648529E−02 |
| A7 | −8.20207315E−02 | −1.49065850E−02 | 1.18578716E−02 | −1.48236564E−02 |
| A8 | −1.16395229E−02 | 4.48816220E−03 | −2.36709077E−03 | 2.11370806E−03 |
| A9 | 5.16888731E−02 | 7.38476502E−03 | −1.26984090E−03 | 1.41315581E−03 |
| A10 | −2.03427427E−02 | −3.02754658E−03 | −1.24037723E−05 | −4.32614715E−04 |
| A11 | | | | |
| A12 | | | | |
| A13 | | | | |
| A14 | | | | |
| A15 | | | | |
| A16 | | | | |

TABLE 7

EXAMPLE 7

(a)
f = 4.513 FNo. = 2.80
LENS DATA

| Si (SURFACE NUMBER) | Ri (RADIUS OF CURVATURE) | Di (DISTANCE BETWEEN SURFACES) | Ndj (REFRACTIVE INDEX) | vdj (Abbe NUMBER) |
|---|---|---|---|---|
| (STOP) St | ∞ (STOP) | −0.12 | | |
| 1 | 1.809 | 0.900 | 1.510 | 55.94 |
| 2 | 35.867 | 0.880 | | |
| 3 | −0.992 | 0.650 | 1.606 | 26.92 |
| 4 | −2.218 | 0.140 | | |
| 5 | 1.546 | 1.130 | 1.532 | 55.12 |

TABLE 7-continued

EXAMPLE 7

| 6 | 3.002 | 1.000 | | |
|---|---|---|---|---|
| 7 | ∞ | 0.300 | 1.516 | 64.14 |
| 8 | ∞ | 0.605 | | |

(b)

| ASPHERIC COEFFICIENT | ASPHERIC DATA | | | |
|---|---|---|---|---|
| | FIRST SURFACE | THIRD SURFACE | FOURTH SURFACE | FOURTH SURFACE |
| K | 1.45515350E+00 | 0.00000000E+00 | −1.43673016E+00 | −3.68719730E−01 |
| A3 | −4.28548247E−03 | 1.98219229E−02 | −1.15416423E−02 | −1.19196444E−01 |
| A4 | 1.18345939E−02 | −1.18735934E−01 | −4.39774811E−02 | −7.00030007E−02 |
| A5 | −7.77338851E−02 | 1.70397637E−01 | −2.32458324E−01 | 7.74324629E−02 |
| A6 | 6.60448081E−02 | −1.40860058E−01 | 1.30486540E−01 | 3.78333566E−02 |
| A7 | 1.28659623E−02 | −5.11665258E−02 | 7.88728353E−02 | 1.48658950E−02 |
| A8 | −4.41124400E−02 | 8.38267065E−02 | 3.88617425E−02 | −9.21614086E−05 |
| A9 | −9.18560482E−03 | 6.09377872E−03 | 5.32298014E−02 | −1.08015228E−02 |
| A10 | 3.89825787E−03 | −4.69813305E−02 | −1.43622349E−01 | 1.55804998E−03 |

| ASPHERIC COEFFICIENT | ASPHERIC DATA | |
|---|---|---|
| | FIFTH SURFACE | SIXTH SURFACE |
| K | −7.03006363E+00 | −1.04439120E+01 |
| A3 | −8.87859239E−02 | 5.25496662E−02 |
| A4 | −4.15053201E−02 | −1.36751910E−01 |
| A5 | 6.66127304E−02 | 5.11680680E−02 |
| A6 | 7.56280277E−04 | 8.20413056E−03 |
| A7 | −1.42310431E−02 | −7.46334867E−03 |
| A8 | −2.01937267E−03 | −1.17776981E−03 |
| A9 | 3.76413454E−03 | 1.32097355E−03 |
| A10 | −7.15459274E−04 | −2.32836345E−04 |
| A11 | | |
| A12 | | |
| A13 | | |
| A14 | | |
| A15 | | |
| A16 | | |

TABLE 8

| | FORMULA (1) $f1/f$ | FORMULA (2) $f3/f$ |
|---|---|---|
| EXAMPLE 1 | 0.55 | 1.13 |
| EXAMPLE 2 | 0.54 | 1.18 |
| EXAMPLE 3 | 0.65 | 1.73 |
| EXAMPLE 4 | 0.74 | 1.78 |
| EXAMPLE 5 | 0.83 | 0.52 |
| EXAMPLE 6 | 0.94 | 1.01 |
| EXAMPLE 7 | 0.82 | 1.05 |

TABLE 9

SPECTRAL CHARACTERISTIC OF VISUAL SENSITIVITY

| | WAVELENGTH (nm) | | | | |
|---|---|---|---|---|---|
| | 470 | 510 | 555 | 610 | 650 |
| Weight | 0.091 | 0.503 | 1 | 0.503 | 0.107 |

What is claimed is:

1. An imaging lens for forming an optical image of an object on an imaging surface that is convex toward a light incident side, wherein a defocus MTF peak position in a sagittal direction or a tangential direction at an arbitrary image height in a range of from 70% to 100% of a maximum image height of the optical image is located further in a light-traveling direction than a same kind of defocus MTF peak position on an optical axis of the imaging lens.

2. An imaging lens, as defined in claim 1, wherein the defocus MTF peak position in the sagittal direction or the tangential direction at the maximum image height is located further in a light-traveling direction than a same kind of defocus MTF peak position on the optical axis.

3. An imaging lens, as defined in claim 1, wherein the defocus MTF peak position in the sagittal direction or the tangential direction at 80% of the maximum image height is located further in a light-traveling direction than a same kind of defocus MTF peak position on the optical axis.

4. An imaging lens, as defined in claim 1, wherein the imaging lens is composed of a first lens having positive power, a second lens, a third lens having positive power and a fourth lens, which are arranged in this order from an object side of the imaging lens, and wherein the following formulas (1) and (2) are satisfied at the same time:

$$0.49 < f1/f < 1.0 \quad (1); \text{ and}$$

$$0.5 < f3/f < 3.0 \quad (2),$$

where f is the focal length of the entire system of the imaging lens, f1 is the focal length of the first lens, and f3 is the focal length of the third lens.

5. An imaging lens, as defined in claim 4, wherein the following formulas (3) and (4) are satisfied at the same time:

$$0.49 < f1/f < 0.69 \quad (3); \text{ and}$$

$$0.7 < f3/f < 2.0 \quad (4).$$

6. An imaging apparatus comprising:
an imaging lens, as defined in claim 1; and
an imaging device having the imaging surface for imaging the optical image formed through the imaging lens.

7. An information terminal apparatus comprising:
the imaging apparatus, as defined in claim 6.

8. An imaging lens for forming an optical image of an object on an imaging surface that is convex toward a light incident side, wherein defocus MTF peak positions in a sagittal direction or a tangential direction at all of image heights in a range of from 80% to 100% of a maximum image height of the optical image are located further in a light-traveling direction than a same kind of defocus MTF peak position on an optical axis of the imaging lens.

9. An imaging lens, as defined in claim 8, wherein the imaging lens is composed of a first lens having positive power, a second lens, a third lens having positive power and a fourth lens, which are arranged in this order from an object side of the imaging lens, and wherein the following formulas (1) and (2) are satisfied at the same time:

$$0.49 < f1/f < 1.0 \qquad (1); \text{ and}$$

$$0.5 < f3/f < 3.0 \qquad (2), \text{ where}$$

f is the focal length of the entire system of the imaging lens,
f1 is the focal length of the first lens, and
f3 is the focal length of the third lens.

10. An imaging lens, as defined in claim 9, wherein the following formulas (3) and (4) are satisfied at the same time:

$$0.49 < f1/f < 0.69 \qquad (3); \text{ and}$$

$$0.7 < f3/f < 2.0 \qquad (4).$$

11. An imaging apparatus comprising:
an imaging lens, as defined in claim 8; and
an imaging device having the imaging surface for imaging the optical image formed through the imaging lens.

12. An information terminal apparatus comprising:
the imaging apparatus, as defined in claim 11.

\* \* \* \* \*